US010818296B2

(12) United States Patent
Huang et al.

(10) Patent No.: US 10,818,296 B2
(45) Date of Patent: Oct. 27, 2020

(54) METHOD AND SYSTEM OF ROBUST SPEAKER RECOGNITION ACTIVATION

(71) Applicant: Intel Corporation, Santa Clara, CA (US)

(72) Inventors: Jonathan J. Huang, Pleasanton, CA (US); Tobias Bocklet, Munich (DE)

(73) Assignee: Intel Corporation, Santa Clara, CA (US)

(*) Notice: Subject to any disclaimer, the term of this patent is extended or adjusted under 35 U.S.C. 154(b) by 211 days.

(21) Appl. No.: 16/014,356

(22) Filed: Jun. 21, 2018

(65) Prior Publication Data

US 2019/0043507 A1   Feb. 7, 2019

(51) Int. Cl.
| | |
|---|---|
| *G10L 17/00* | (2013.01) |
| *G10L 17/24* | (2013.01) |
| *G10L 17/22* | (2013.01) |
| *G10L 17/04* | (2013.01) |
| *G10L 17/10* | (2013.01) |

(52) U.S. Cl.
CPC ............ *G10L 17/005* (2013.01); *G10L 17/22* (2013.01); *G10L 17/24* (2013.01); *G10L 17/04* (2013.01); *G10L 17/10* (2013.01)

(58) Field of Classification Search
CPC .......... G06K 9/00926; G06K 9/00255; G06K 9/00288; G06K 9/00718; G06K 9/00899; G06F 16/784; G06F 16/7834; G06F 21/32; G10L 17/005; G10L 17/06; G10L 17/24; G10L 17/26; G10L 15/30; G10L 17/02
See application file for complete search history.

(56) References Cited

U.S. PATENT DOCUMENTS

| | | | |
|---|---|---|---|
| 7,260,527 B2 | 8/2007 | Koshiba | |
| 7,778,831 B2 | 8/2010 | Chen | |
| 8,000,962 B2 | 8/2011 | Doyle et al. | |
| 8,050,922 B2 | 11/2011 | Chen | |
| 8,190,430 B2 | 5/2012 | Doyle et al. | |
| 8,301,514 B1* | 10/2012 | Vippagunta | G06Q 30/0631 705/14.49 |
| 8,639,508 B2 | 1/2014 | Zhao et al. | |
| 9,208,782 B2 | 12/2015 | Nakadai et al. | |
| 9,317,736 B1* | 4/2016 | Siddiqui | G10L 17/22 |
| 9,390,726 B1* | 7/2016 | Smus | G10L 15/22 |
| 9,548,979 B1* | 1/2017 | Johnson | H04L 63/0861 |
| 9,641,585 B2* | 5/2017 | Kvaal | H04L 65/605 |
| 9,792,907 B2 | 10/2017 | Bocklet et al. | |
| 9,947,324 B2 | 4/2018 | Tsujikawa et al. | |

(Continued)

FOREIGN PATENT DOCUMENTS

WO    2015076828    5/2015

OTHER PUBLICATIONS

Ratnam, et al., "Blind estimation of reverberation time", Journal of Acoustical Society of America; vol. 114; No. 4; pp. 2877-2892; Nov. 2003.

(Continued)

*Primary Examiner* — Mohammad K Islam
(74) *Attorney, Agent, or Firm* — Green, Howard & Mughal LLP.

(57) ABSTRACT

Techniques related to a method and system of robust speaker recognition activation are described herein. Such techniques apply keyphrase detection and speaker recognition to a subsequent phrase after detecting a waking keyphrase.

16 Claims, 11 Drawing Sheets

(56) References Cited

U.S. PATENT DOCUMENTS

| | | | |
|---|---|---|---|
| 9,972,322 B2 | 5/2018 | Biswal et al. | |
| 9,984,314 B2* | 5/2018 | Philipose | G06K 9/6256 |
| 10,043,521 B2 | 8/2018 | Booklet et al. | |
| 10,210,685 B2* | 2/2019 | Borgmeyer | G06K 19/0723 |
| 10,305,895 B2* | 5/2019 | Barry | G06K 9/2036 |
| 10,467,509 B2* | 11/2019 | Albadawi | G06T 7/292 |
| 2006/0265223 A1 | 11/2006 | Doyle et al. | |
| 2009/0119103 A1 | 5/2009 | Gerl et al. | |
| 2009/0171660 A1 | 7/2009 | Jian et al. | |
| 2009/0319270 A1* | 12/2009 | Gross | G10L 15/22 704/246 |
| 2010/0204993 A1 | 8/2010 | Vogt | |
| 2011/0246198 A1* | 10/2011 | Asenjo | B66B 13/26 704/247 |
| 2012/0004912 A1 | 1/2012 | Doyle et al. | |
| 2012/0209609 A1 | 8/2012 | Zhao et al. | |
| 2013/0225128 A1 | 8/2013 | Gomar | |
| 2013/0227678 A1* | 8/2013 | Kang | G06F 21/32 726/19 |
| 2014/0237576 A1* | 8/2014 | Zhang | G06F 21/32 726/7 |
| 2014/0307876 A1* | 10/2014 | Agiomyrgiannakis | G10L 21/003 381/17 |
| 2014/0330568 A1* | 11/2014 | Lewis | G10L 15/22 704/273 |
| 2015/0012268 A1 | 1/2015 | Nakadai et al. | |
| 2015/0112682 A1* | 4/2015 | Rodriguez | G10L 17/06 704/249 |
| 2015/0134330 A1* | 5/2015 | Baldwin | G06F 21/32 704/232 |
| 2015/0332665 A1* | 11/2015 | Mishra | G10L 15/1815 704/257 |
| 2016/0217321 A1* | 7/2016 | Gottlieb | G06K 9/00308 |
| 2017/0068805 A1* | 3/2017 | Chandrasekharan | G06F 3/167 |
| 2017/0110121 A1* | 4/2017 | Warford | H04M 3/5175 |
| 2017/0213268 A1* | 7/2017 | Puehse | B25J 11/0005 |
| 2017/0278512 A1* | 9/2017 | Pandya | G10L 15/08 |
| 2017/0279815 A1* | 9/2017 | Chung | H04L 63/123 |
| 2017/0287490 A1 | 10/2017 | Biswal et al. | |
| 2017/0323644 A1* | 11/2017 | Kawato | G10L 17/00 |
| 2017/0351487 A1* | 12/2017 | Aviles-Casco Vaquero | G06F 3/167 |
| 2018/0082692 A1 | 3/2018 | Khoury et al. | |
| 2018/0107866 A1* | 4/2018 | Li | G06K 9/00288 |
| 2018/0121161 A1* | 5/2018 | Ueno | G06F 3/0412 |
| 2018/0174600 A1* | 6/2018 | Chaudhuri | G06K 9/00744 |
| 2018/0187969 A1* | 7/2018 | Kim | F25D 29/00 |
| 2018/0232201 A1* | 8/2018 | Holtmann | G10L 15/26 |
| 2018/0308487 A1* | 10/2018 | Goel | G10L 15/1815 |
| 2018/0314689 A1* | 11/2018 | Wang | G10L 15/22 |
| 2018/0336716 A1* | 11/2018 | Ramprashad | G06F 3/012 |
| 2018/0366124 A1 | 12/2018 | Cilingir et al. | |
| 2019/0027152 A1 | 1/2019 | Huang et al. | |
| 2019/0042871 A1* | 2/2019 | Pogorelik | H04N 5/23219 |
| 2019/0098003 A1* | 3/2019 | Ota | G10L 17/06 |
| 2019/0197649 A1* | 6/2019 | Jones | G07B 17/00508 |
| 2019/0197755 A1* | 6/2019 | Vats | G06T 13/40 |
| 2019/0246075 A1* | 8/2019 | Khadloya | H04N 7/183 |
| 2019/0260731 A1* | 8/2019 | Chandrasekharan | G06F 3/165 |
| 2019/0294629 A1* | 9/2019 | Wexler | G06F 16/50 |
| 2019/0295554 A1* | 9/2019 | Lesso | G10L 17/22 |
| 2019/0311722 A1* | 10/2019 | Caldwell | G10L 17/02 |
| 2019/0313014 A1* | 10/2019 | Welbourne | G06K 9/00221 |
| 2019/0356588 A1* | 11/2019 | Shahraray | G06N 3/08 |

OTHER PUBLICATIONS

Reynolds, et al., "Speaker Verification Using Adapted Gaussian Mixture Models", Digital Signal Processing; vol. 10; pp. 19-41; 2000.

Richiardi, Jones et al., "Confidence and reliability measures in speaker verification", www.sciencedirect.com; Signal Processing Institute, Swiss Federal Institute of Technology Lausanne, EPFL-STI-ITS-LIDIAP, ELD 243, Station 11, 1015 Lausanne, Switzerland.

Villalba, Jesus et al., "Analysis of speech quality measures for the task of estimating the reliability of speaker verification decisions", www.sciencedirect.com; www.elsevier.com/locate/specom; Speech Communication 78 (2016): 42-61.

Wen, et al., "Blind Estimation of Reverberation Time Based on the Distribution of Signal Decay Rates", ICASSP, 2008; pp. 329-332.

* cited by examiner

MONITOR A CAPTURED AUDIO SIGNAL OF SOUND CAPTURED FROM AT LEAST ONE MICROPHONE TO AUTOMATICALLY RECOGNIZE AT LEAST ONE SPEAKER OF AT LEAST ONE TARGETED WAKING KEYPHRASE IN THE CAPTURED AUDIO SIGNAL 302

↓

MONITOR A NON-WAKING SUBSEQUENT PHRASE IN THE CAPTURED AUDIO SIGNAL THAT IS SUBSEQUENT TO THE WAKING KEYPHRASE TO DETECT AT LEAST ONE ADDITIONAL TARGETED KEYPHRASE IN THE SUBSEQUENT PHRASE 304

↓

APPLY SPEAKER RECOGNITION TO THE SUBSEQUENT PHRASE 306

↓

PERMIT AN APPLICATION TO ACT IN RESPONSE TO SPEECH CONTENT OF THE CAPTURED AUDIO SIGNAL AT LEAST PARTLY DEPENDING ON THE SPEAKER RECOGNITION APPLIED TO BOTH THE WAKING KEYPHRASE AND THE SUBSEQUENT PHRASE 308

```
MONITOR TD-SR MODELS FOR ENROLLED COMMAND
PHRASES 852
  DETERMINE WHETHER MODELS COVER A
  SUFFICIENT PORTION OF USUAL COMMANDS 854
```

↓

TURN OFF SECURITY PHRASE DETECTION 856

↓

PROVIDE INDICATION TO USER THAT SECURITY PHRASE IS NO LONGER NEEDED 858

↓

SET WAKING KEYPHRASE DETECTION TO TRIGGER COMMAND KEYPHRASE DETECTION 860

FIG. 9

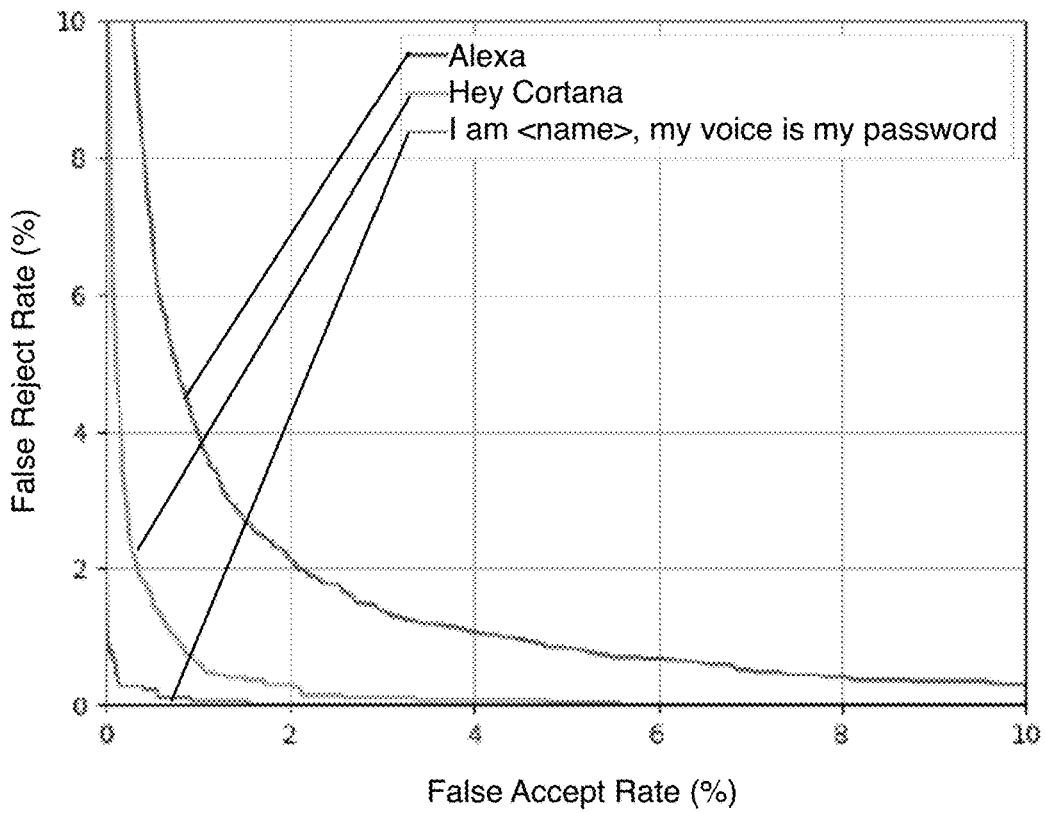

900

— Alexa
— Hey Cortana
— I am <name>, my voice is my password

False Reject Rate (%) vs False Accept Rate (%)

METHOD AND SYSTEM OF ROBUST SPEAKER RECOGNITION ACTIVATION

BACKGROUND

Many intelligent computer or computing devices have artificial intelligence (AI) assistants (also referred to herein as virtual assistants (VAs), speech assistants (SAs), or personal assistants (PAs)) that recognize certain keyphrases from a user speaking into a microphone on the device in order to wake the PA and then provide the PA with commands either instructing the PA to perform a task or requesting information. Such popular waking keyphrases include Apple's "Siri", Amazon's "Alexa", "Hey Alexa", or "computer", Microsoft's "Cortana", Google's "Hey Google", and Samsung's "Hi Bixby". These waking keyphrases trigger an automatic speech recognition program that analyzes the command so that the device can understand what automatic action needs to be taken in response to the command.

To activate certain high security tasks, these activation systems also use speaker recognition when it is important that only an authorized person uttering the keyphrases be able to activate the task. For example, such tasks may include opening a garage door, accessing email, or making online purchases. The speaker recognition, however, often has errors when room reverberation, ambient noise, and/or media playback from the device contribute to degradation of the audio signals, and in turn, speaker recognition accuracy.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart of an example process for robust speaker recognition activation according to at least one of the implementations herein;

FIG. 8A is flow chart of an example process to discontinue use of security keyphrase speaker recognition in favor of command phrase speaker recognition according to at least one of the implementations herein;

FIG. 9 is a graph comparing false accept rates and false reject rates of speaker recognition phrases with different lengths;

DETAILED DESCRIPTION

Figure 1:
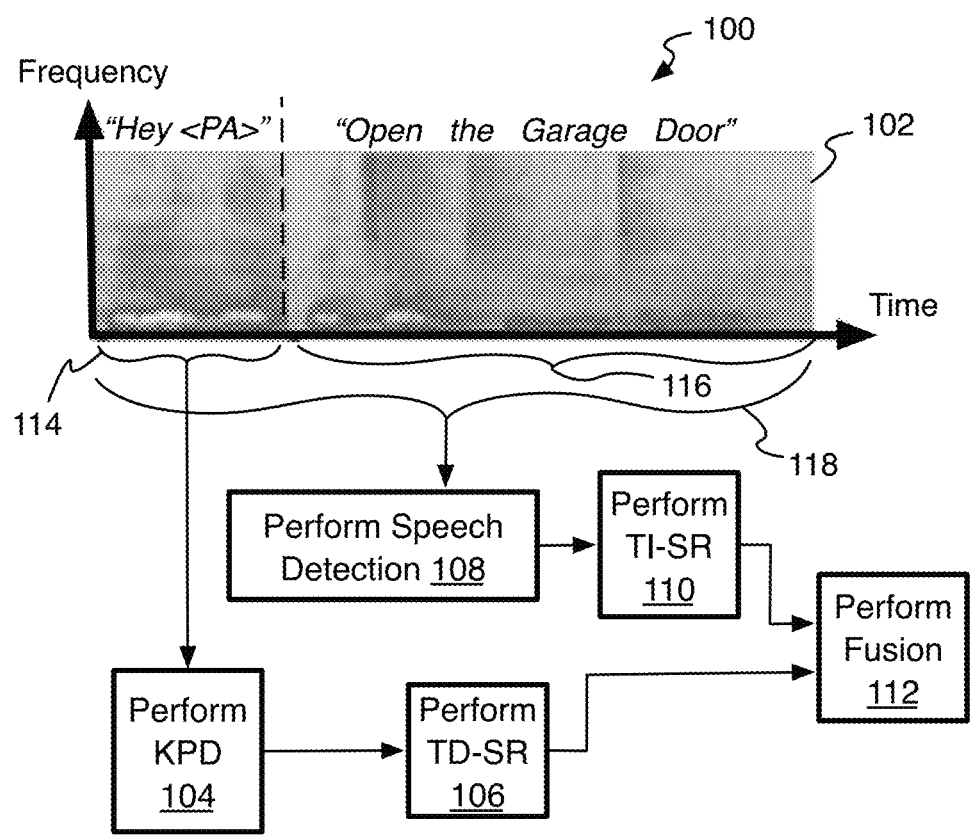
FIG. 1 is a schematic flow chart of a conventional process for speaker recognition activation.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors (DSPs), dedicated hardware, or the like) and/or packages, and/or various computing devices and/or consumer electronic (CE) devices such as smart speakers, smartphones or other smart devices, tablets, computers, automobile audio phone systems, building, room security, or environment control systems, internet of things (IoT) systems, set top boxes, or any other device that has a PA application, may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory machine or computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, systems, and articles of robust speaker recognition activation.

As mentioned, many modern speech-enabled devices come with personal assistant (PA) applications. Usually, a keyphrase detection (KPD) unit or engine detects an audio waking keyphrase in a captured audio signal and this triggers the awakening of a PA. One wake-on-voice (WoV) system that uses a KPD engine wakens upon hearing "Alexa" for example. The user also may audibly provide a command that includes a request for information from the PA or request that the PA (or system with the PA) performs an automatic action. The correct recognition of the waking keyphrase triggers an automatic speech recognition application to analyze the command and determine what is being requested or ordered. The PA or other programs activated by the PA can then provide the appropriate response or action. It will be understood that the audio waking keyphrase may trigger other applications (or computer programs) in addition to, or instead of a PA, but the PA is used as an example to explain the implementations herein. It also should be noted that KPD is different than large-vocabulary ASR (LVASR) because KPD is trained on a very small dictionary of only a certain small number of keyphrases so that matching features of an input audio signal to features of keyphrases greatly reduces the time for searching for and recognizing the words compared to known ASR that has very large vocabularies. Due to the much lower vocabulary requirement of KPD, it has a much smaller acoustic model and simpler decoder, allowing for always-on operation using specialized hardware operating on a low power budget.

It should be noted that herein a keyphrase refers to any sound, phoneme, part of a word, syllable, word, and/or phrase that can be used as a separate language entity to match an input speaker feature to a modeled voice profile and that can be repeated in utterances spoken by a user. Thus, the term keyphrase is not limited to only single individual words or only a collection of words (e.g., a phrase).

Referring to FIG. 1, and also as mentioned above, speaker recognition may be used to determine if the user uttering both the waking keyphrase and a command to a PA is authorized to activate the task ordered by the command, and process 100 provides the conventional techniques for providing this higher security level of protection. For example, a known hybrid system that uses both text-dependent and text-independent speaker recognition may be used. To initiate the system, a device-user utters a waking keyphrase together with a command, such as "Hey Alexa, open the garage door" that forms a captured audio signal generated by one or more microphones on the device, and represented by a waking keyphrase portion 114 of a spectrogram of the captured audio signal 102. The system performs keyphrase detection (KPD) 104 and analyzes the signal (or listens) for the waking keyphrase. This may be performed by a KPD unit (or just KPD for keyphrase detector), also referred to herein as a wake-on-voice (WoV) system (or engine or unit).

After successful waking keyphrase recognition, the waking keyphrase is segmented and passed to a text-dependent speaker recognition (TD-SR) unit or engine that performs text-dependent recognition 106 to form one or more speaker scores indicating the likelihood that an authorized user uttered the waking keyphrase. Then, the command part of the captured audio signal 116, or the entire signal with waking keyphrase plus command 118, may be processed by performing speech detection 108 so that the speech in the signal is properly segmented. The segmented speech is then passed to a text-independent speech recognition (TI-SR) unit to perform the TI-SR 110 to determine one or more speaker scores that indicate the likelihood that the command (or entire utterance) was spoken by an authorized user. Thereafter, the scores may be fused 112 to form a single score, or single score set, that is compared to criteria to finally determine whether an authorized speaker uttered the waking keyphrase and command. If so, the command is carried out by the device with the PA.

There are several shortcomings to the conventional existing speaker recognition activation systems. As mentioned, degradation of the audio signal may be caused by room reverberation and ambient noise resulting in reduced accuracy with the speaker recognition, whether false accepts (authorizing the wrong user) or false rejects (rejecting the authorized user). Also, short waking keyphrases like "Hey Alexa" are intentionally selected for quick, convenient user interactions. Even though keyphrase detection is very robust for detecting a certain waking keyphrase in the audio signal (no matter the speaker), the speaker recognition performance is typically inadequate because there is insufficient phonetic content in the waking keyphrase (i.e., the phrase is too short) so that there is an insufficient amount of data for accurate and reliable speaker recognition. Speaker recognition relies on statistical and probabilistic algorithms, neural networks to compare the spectral characteristics of an utterance against the enrolled model. These algorithms perform better when the length of test utterance is longer when this more phonetic material for a pattern matching algorithm.

Furthermore, a main use of residential smartspeakers is to have music playing or other audio media being emitted from the smart speaker. Accordingly, the smart speakers have the ability to listen for waking keyphrases while the music is playing. However, when music is playing on the device and the keyphrase is spoken, the signal-to-noise ratio (SNR) is very low. It has been found herein that text-dependent speaker recognition is more accurate than text-independent speaker recognition on speech of the same length so that the lowering of the SNR during the utterance of the waking keyphrase (text-dependent SR) reduces the best chances for a more accurate speaker recognition decision (whereas the text-independent speaker recognition used during the command has less accuracy anyway). This is because TI-SR typically requires much longer test utterances than TD-SR because TI-SR has so much more variability in the enrolled modeled voice samples than in TD-SR. Thus, severe degradation results in the most important part of the speech while there is music playback. Also, even if music is stopped after the waking keyphrase so the command portion of the speech is cleaner, the system then may overly rely on the TI-SR analysis of the command, which as mentioned is less accurate than the TD-SR on such short utterances to begin with, thereby still resulting in lower accuracy speaker recognition.

It will be appreciated that while usually the term speaker recognition (SR) includes both speaker verification (comparison to multiple voices) (SV) and speaker identification (search for a single voice) (SID), these three terms are used in the general sense herein to refer to any type of speaker recognition no matter how many voices are enrolled, and these terms may be used interchangeably herein.

To resolve these issues, the systems and methods presented herein provide a user interaction mechanism that uses increased length of phonetically-constrained speech to improve speaker recognition accuracy. Specifically, keyphrase detection and text-dependent speaker recognition is applied to a subsequent phrase in addition to waking keyphrase detection and speaker recognition of a waking keyphrase. This has the effect of providing more phonetically-constrained (text-dependent) data for more accurate speaker recognition, and it has been found that for higher security applications, users are more willing to tolerate a slightly longer interaction when provided the perception of greater security anyway. The subsequent phrase may be the command portion or phrase (e.g., "open the garage door") after the waking keyphrase (e.g., Alexa) of a captured audio signal. Otherwise, the subsequent phrase may be a security phrase (e.g., it could be a "<password>", or a phrase such as "my name is my password"), and in this latter case, the actual command phrase to a PA occurs after the security phrase in the captured audio signal.

Also, applying text-dependent speaker recognition to multiple phrases in the captured audio signal provides multiple options as to how to form a final decision as to whether or not the speaker of the captured audio signal is recognized. For instance, and for an even greater level of security, the results of the speaker recognition from the different phrases can be fused to form a single result or speaker score and that may factor the results or scores from the waking keyphrase, security phrase, and the command phrase, or any combination of these. By one form, a cascading process may be used where a first speaker score, or fused first and second speaker scores from the waking and security TD-SR operations, are tested to determine if the scores meet one or more criterion, and then depending on whether the scores meet the criterion, the speaker score or scores of the remaining phrase(s) may be tested. Using these various fusion techniques, the disclosed solutions will result in much higher speaker recognition confidence scoring minimally impacting user experience.

Additionally, use of the security phrase may be merely temporary. Particularly, after multiple interactions, the system may learn a dictionary of commonly used commands by employing an ASR system. KPD and TD-SR models can be trained implicitly for every such command, or single keyphrases or words in the commands. For example, if the system observes "open the garage" several times, it can build a TD model for that command. Over time, as the system learns the common commands that are usually used in a household or office for example, the security phrase can be dropped from the interaction, resulting in the normal user interaction of waking keyphrase followed by command phrase. The system then may inform the user there is no need to say the security phrase next time such a command is desired.

Further, in order to reduce the undesirable degradation of the audio caused by media playback, the media playback can be stopped immediately once the waking (or WoV) keyphrase is detected so that the security phrase can be captured with minimal noise. The combination of a longer phrase and the lack of playback noise will greatly improve speaker recognition performance. Also, because TD-SR operations can be used instead of TI-SR on the command and/or security phrase, the error rates will be significantly lower compared to the conventional speaker recognition activation systems. Thus, these disclosed solutions will result in much better speaker recognition performance under many scenarios, with minimal aggravation for the user. More details and other variations are provided below.

Figure 2:
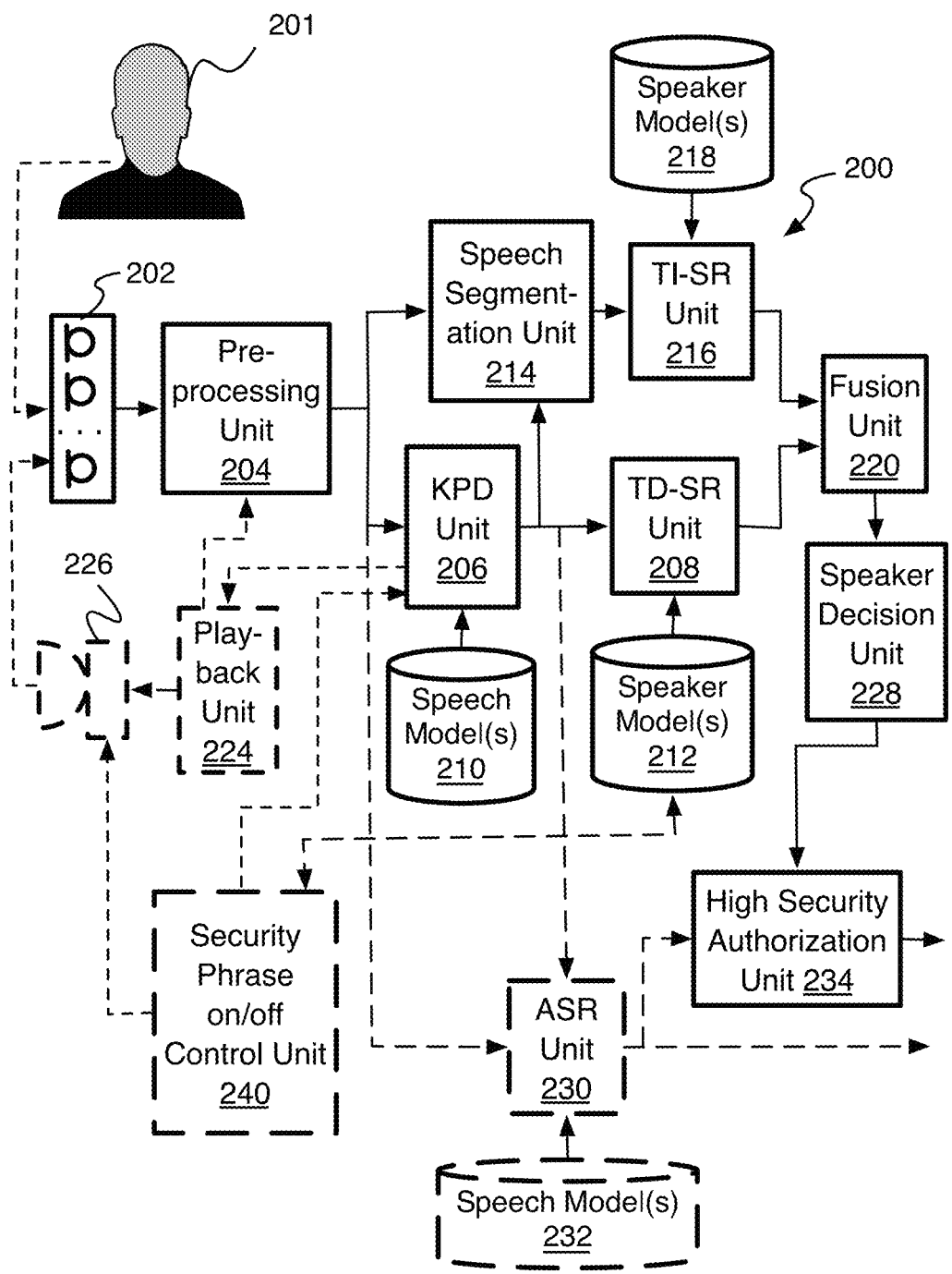
FIG. 2 is a schematic diagram of an audio processing device to perform robust speaker recognition activation according to at least one of the implementations herein.

Referring to FIG. 2, an audio processing device or system 200 operates the implementations described herein. Specifically, the audio processing device 200 performs high security speech recognition activation for a personal assistant (PA) application or other applications. Device 200 may be any suitable audio computing device such as a computer, a smart speaker, a personal speech assistant, a laptop, an ultra-book, a smartphone, a tablet, a phablet, a wearable device such as a smart watch or wrist band, eye glasses, head phones, a security system device whether for physical security of something (e.g., a door, a safe, and so forth) or a computer security system (e.g., email, network, or computer access), and the like.

The audio processing device 200 may have a microphone or microphone array 202 that receives sound waves from a user 201 and could include audio output from one or more loudspeakers 226 of a playback unit 224. The microphone 202 provides a captured audio signal and/or audio data to a pre-processing unit 204. The pre-processing unit 204 may provide the pre-processed audio signal or data to at least one keyphrase detection unit 206 with a speech model(s) unit 210, at least one speech segmentation unit 214, and/or at least one ASR unit 230 with speech model(s) 232. The device 200 also may have at least one TD-SR unit 208 with speaker model(s) 212 that is activated when the KPD unit 206 finds keyphrases. Also, at least one text-independent speaker recognition TI-SR unit 216 with speaker model(s) 218 may operate when provided speech segmentation of an audio signal by the speech segmentation unit 214. A fusion unit 220 may receive the results or speaker scores of the various speaker recognition units, and then provide the speaker scores to a speaker decision unit 228. A high security authorization unit 234 may use words recognized by the ASR unit 230 to determine if speaker authorization is required for a certain command received from a user. Optionally, a security phrase control unit 240 also may be included to determine when a TD-SR model is sufficiently developed so that the security phrase need not be used any more, and may initiate informing the user of this state of the system.

The playback unit 212, here on the same device 200, may emit audio including media such as music, movie sound tracks, radio, audio from internet videos and so forth. It will be understood that the playback unit 212 may be located on a device separate from the current device receiving and analyzing the captured audio signal. The playback unit 212 could be remote controlled from the current device for instance. The audio may be emitted through one or more of the loudspeakers 226.

The microphone or microphone array 202 receives audio input or sound waves from a user 201 and the one or more speakers 226. The microphone 202 is not particularly limited as to structure as long as the microphone 202 can process the sound waves and convert them into the captured audio signal. This may include an analog-to-digital convertor (ADC) or such ADC converter may be provided by one of the other units on device 200, such as the pre-processing unit 204. By one form, the microphone 202 can feature a beamformer to reduce background noise and dereverberation to mitigate room reverberation.

The pre-processing unit 204 may perform sufficient pre-processing of the captured audio signal to perform speaker recognition and keyphrase detection as described herein. The pre-processing may include other denoising and other signal treatments as well. The pre-processing also may include obtaining samples of the captured audio signal for analysis and by some set sampling frequency to be analyzed sample by sample during feature extraction for example.

The pre-processed captured audio signal then may be provided to the keyphrase detection (KPD) unit 206 to detect trigger or targeted keyphrases in the captured audio signal, and as modeled in the speech model(s) 210. If not performed by the pre-processing already, the KPD unit 206 may perform feature extraction that converts the signal into the frequency domain (such as by using fast Fourier transform (FFT)) and forms the samples into frames. The feature extraction then may provide feature coefficients or feature vectors per frame in the form of mel-frequency cepstrum coefficients (MFCCs) or mel-filterbank coefficients for example. By one option, a shared feature extraction unit could be provided and the KPD unit 206, the segmentation unit 214, and the speaker recognition units 208 and 216 could all use the same features from the captured audio signal and for the various operations.

The keyphrase detection unit 206 then may perform model scoring using neural networks for example. The system calculates features, e.g., MFCCs, on 25 ms segments with a time shift of 10 ms. Frame wise acoustic scores are then computed by a neural network, and during a decoding process, these scores are combined to form a final keyphrase score. The final decision is then based on a threshold. Such a process is disclosed by U.S. Pat. No. 9,792,907, filed Nov. 24, 2015, and issued Oct. 17, 2017, which is incorporated herein for all purposes.

The keyphrase detection by the KPD unit 206 may be applied at different stages. At first, the KPD unit 206 is used to detect waking keyphrases in a WoV mode. Then the KPD 206 may be used to detect security keyphrases in a security phrase, and thereafter detect additional keyphrases in a command phrase when the speech models 210 are established for such detection. If the waking keyphrase exists, this triggers the awakening of an ASR unit 230 of a PA to determine the meaning of an upcoming command. This also activates the TD-SR unit 208 to apply speaker recognition to the detected waking keyphrase to determine the speaker of the waking keyphrase. Then if a security phrase is being used, the KPD unit and TD-SR unit repeat the keyphrase and speaker recognition process on the security phrase. Instead of the security phrase, or after the security phrase analysis, the KPD unit 206 monitors the captured audio signal for command keyphrases in a command phrase. If none are detected, the device 200 uses the speech segmentation unit 214 to segment the signal into speech and non-speech parts, and then has the TI-SR unit 208 apply text-independent speaker recognition to the signal. If the command keyphrases are detected by the KPD unit 206, then TD-SR may be applied by the TD-SR unit 208 instead.

The fusion unit 220 may receive each of the speaker results or scores to fuse them into a single score (or single set of scores) or other results. A fused speaker score or result can be a weighted sum, or a classification based-fusion (based at least partly on deep neural network (DNN), support vector machine (SVM), logistic regression, other machine learning algorithms, or the like). The fused score(s) (or result(s)) can then be compared to one or more criteria by the speaker decision unit 228. This may include comparing the fused speaker scores to thresholds, which may be set for specific false accept or false reject rates of an application.

Meanwhile, if not already determined automatically by the KPD unit 206 simply by the fact of which words were detected, the ASR unit 230 may provide the indication of which words, phrase, and/or sentence for example were recognized in the command so that the high security authorization unit 234 can decide whether or not the current command requires high security speaker recognition to be acted upon. If not (the command is non-security such as "give me today's weather forecast"), the indicated application is free to perform the command. If it is a high security command ("open the garage door"), the speaker decision is obtained to see if the command is authorized by the recognition of an authorized speaker.

To perform the speaker recognition, the speaker recognition units 208 and 216 first perform feature extraction if not already performed as mentioned above, and then perform model scoring. This is accomplished by having the speaker recognition units 208 and 216 compare enrolled voice profiles to the features obtained from the captured audio signal, which may be in the form of feature representations such as feature vectors. The voice profiles may be pre-enrolled in one or more speaker models 212 or 218 as mentioned.

Also as mentioned, a security phrase on/off control unit 240 monitors the enrollment of the speaker model for the command phrase. By one form, ASR is applied to the command phrases as captured audio signals are analyzed in order to build a dictionary of full command phrases or the individual keyphrases or words in the command phrases. Once the security phrase on/off control unit 240 determines a sufficient coverage of the usual commands are enrolled in the speaker model, the security phrase on/off control unit 240 may indicate that the security phrase is no longer needed and may indicate this to the user, such as by an audible announcement through loudspeakers 226. Thereafter, monitoring for the security phrase may be omitted from the speaker recognition activation process. It will be noted here that ASR, in contrast to KPD, will usually refer to the full-ASR process with front end feature extraction, acoustic scoring, decoding by weighted finite state transducer (WFST) or neural networks for example, and then language interpretation, although variations or different types of ASR could be applied as well.

While the device 200 is described as having the keyphrase detection unit 206, speaker recognition unit 208, speaker model 210, and playback unit 212, it will be understood that any or all of these units, whether the entire unit or just parts of these units, may actually be physically located remote from the device 200 that has the microphones 202 and first generates the captured audio signal. These units are at least communicatively connected to the other units of the device 200 to receive the captured audio signal, perform the keyphrase detection and/or speaker recognition, and then transmit the results back to the physical device 200 for example. Thus, these units may be located at a server communicating over a network such as a wide area network or the internet or other network such as a local area network (LAN) as one example.

Referring to FIG. 3, an example process 300 of robust speaker recognition activation is arranged in accordance with at least some implementations of the present disclosure. Process 300 may include one or more operations 302-308 generally numbered evenly. Process 300 or portions thereof may be performed by a device or system described herein (e.g., systems 200, 1000, or any other device or system discussed herein).

Process 300 may include "monitor a captured audio signal of sound captured from at least one microphone to automatically recognize at least one speaker of at least one targeted waking keyphrase in the captured audio signal" 302. The captured audio signal refers to the audio data, whether analog or digital, obtained from one or more microphones. This operation includes detection of a waking keyphrase (or assumes this has been done) and now at least the waking keyphrase is being analyzed to determine the speaker of the waking keyphrase. As described herein, this may be performed by using text-dependent speaker recognition (TD-SR) but other techniques could be used.

Process 300 may include "monitor a non-waking subsequent phrase in the captured audio signal that is subsequent to the waking keyphrase to detect at least one additional targeted keyphrase in the subsequent phrase" 304. Here, this operation may be triggered because of the detection of the waking keyphrase and a subsequent phrase is expected either in the form of a command phrase or an added security phrase that comes after the waking phrase but before a command phrase in the captured audio signal. Either the security phrase or the command phrase is monitored to determine if it includes a targeted additional keyphrase (a security keyphrase or a command keyphrase). By one optional form, keyphrase detection is applied to both the security phrase and command phrase.

Process 300 may include "apply speaker recognition to the subsequent phrase" 306, and particularly, TD-SR is applied to the subsequent phrase, whether the security phrase or the command phrase. This may be performed in a number of different ways. As described elsewhere herein, this may be accomplished first by performing a preliminary offline enrollment operation to form a speaker model for the subsequent phrase. By another option, a run-time online enrollment may be performed to build a dictionary for a TD-SR speaker model, and then train the speaker model for the command phrase for example. When the security phrase is initially analyzed for speaker recognition, once the speaker model for the command phrase is sufficiently trained, the security phrase may be omitted.

By other options, applying speaker recognition to the subsequent phrase comprises alternatively performing text-dependent speaker recognition or text-independent speaker recognition depending on whether keyphrase detection finds at least one of the additional keyphrases in the subsequent phrase. When the additional keyphrase is found, TD-SR is applied, but when the additional keyphrase is not found, then TI-SR is applied. Many other options are discussed below.

Process 300 may include "permit an application to act in response to speech content of the captured audio signal at least partly depending on the speaker recognition applied to both the waking keyphrase and the subsequent phrase" 308. By one approach, this involves fusing the SR results (or speaker scores) to form a single result to be compared to one or more criterion such as thresholds to determine if the speaker of the captured audio signal has been recognized (i.e., the input voice sufficiently matches at least one voice profile of the speaker models). This also may involve fusing three SR results including from the waking keyphrase, the security keyphrase, and the command keyphrase to form a single score (or set of scores). Once the speaker has been recognized (or not), a determination may be made as to whether to permit an application to perform a high security command. Other details are as follows.

Figure 4:
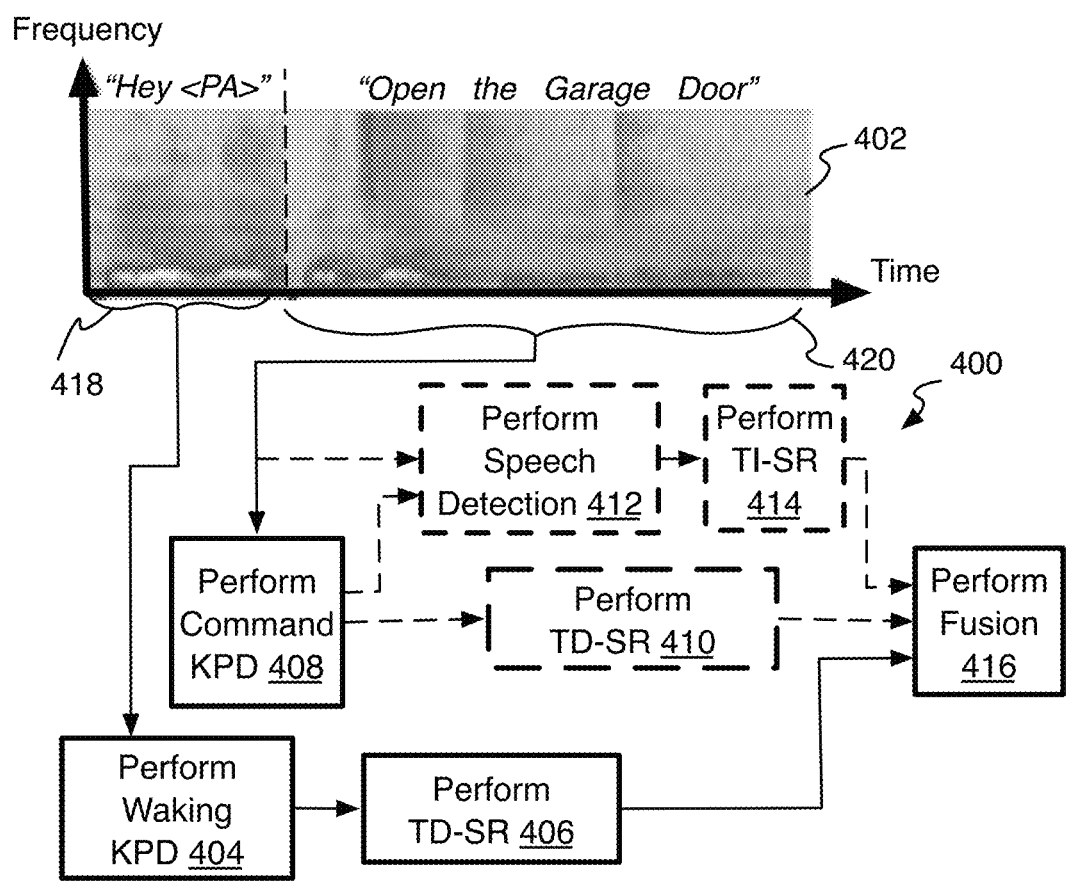
FIG. 4 is a schematic flow chart of an example process for robust speaker recognition activation according to at least one of the implementations herein.

Referring to FIG. 4, one example process 400 of robust speaker recognition activation is arranged in accordance with at least some implementations of the present disclosure. Process 400 may include one or more operations 402-416 generally numbered evenly. Process 400 or portions thereof may be performed by a device or system (e.g., systems 200, 1000, or any other device or system discussed herein).

For process 400, a captured audio signal includes an audible waking keyphrase 418 ("Hey <PA>", where the <PA> may be Alexa for example) and followed by a subsequent phrase that here is a command phrase ("open the garage door") 420. The capturing of the captured audio signal is represented by a spectrogram 402. The command phrase 420 is one that requires a high security authorization thereby requiring speaker recognition authorization. The determination that the command phrase requires high security authorization may be determined by finding certain words (e.g., "open" and "garage") or whole phrases (e.g., "open the garage") in the command phrase by applying ASR to the command phrase or by applying keyphrase detection to the command phrase. This determination may occur before, after, or parallel to a speaker recognition determination.

In detail, waking KPD is performed 404 by monitoring the captured audio signal for a waking keyphrase. If the waking keyphrase is found (a positive detection), TD-SR is applied 406 to the waking keyphrase to determine a score or provide some other SR result that indicates the likelihood that the waking keyphrase was spoken by an automatically recognizable voice.

Next in the case of process 400, the conventional speech detection and TI-SR system applied to a command phrase may be substituted with KPD (such as WoV) followed by TD-SR depending on the command keyphrase detection. Specifically, when the waking keyphrase has been detected, one or more command specific KPD models are then loaded where more than one speaker model can be processed in parallel as well as a speech/non-speech detection engine. In this example, when KPD is performed 408 on the command phrase and a positive KPD trigger (command keyphrase) is found, TD-SR is performed 410 to determine a speaker score or other results for the command phrase. However, when no command keyphrase is found, the speech detection is performed 412 instead, and the selected audio snippets with speech are passed to a TI-SR engine or unit. The TI-SR is performed 414 to detect the speaker of the command phrase 420. By one form, the command KPD plus TD-SR and the command speech detection and TI-SR may be performed in parallel to avoid delays, and the appropriate speaker score of the two is used for fusion depending on whether the command KPD detected the additional keyphrases.

The speaker score (or other result) of the waking keyphrase as well as the speaker score of either the TD-SR or TI-SR of the command phrase are then fused 416 to form a single (or single set) of speaker scores or other results indicating the likelihood of a speaker uttering the captured audio signal. As mentioned above, weighting, neural networks, learning machine classifier algorithms and so forth may be used to form a fusion speaker score or results.

This fusion speaker score or result then may be provided to a decision unit for example for a final determination as to whether the captured audio signal was spoken by a recognized speaker. The decision unit may compare the speaker score to one or more thresholds or otherwise analyze the fusion speaker score to make the final determination.

It will be understood that this process may be continued and repeated as long as a captured audio signal is being received.

As to the enrollment of the voice profiles for the speaker models to be used for speaker recognition, by one form, a preliminary enrollment operation may be performed that enrolls a user uttering words or phrases that are to be uttered in waking keyphrases or command keyphrases (and/or security keyphrases as described below). For text-dependent speaker recognition, the user is told to utter expected keyphrases. For text-independent speaker recognition, the user is told to speak for a certain length of time, such as 1-2 minutes, and this may be a random sentence or phrase that makes grammatical sense or could be random words, but in either case may still include one or more potential trigger keywords. Also, the enrollment may be repeated for a number of different voices such as for each member in a family in a home for example.

The enrollment process also may include feature extraction to extract acoustic features from an enrollment signal received from the microphones, and the resulting feature representations are then used to build speaker models 510. The features can be representations such as spectrograms, Mel-Frequency Cepstral Coefficients (MFCCs), perceptual linear predictive (PLP) cepstral coefficients, mel-filterbank coefficients. Typically, these low-level features are fed into a machine learning algorithm such as a neural network, i-vector, or GMM-supervector, etc., to obtain a representation that is more suitable for speaker recognition. Finally, a backend classifier such as support vector machine (SVM), probabilistic linear discriminative analysis (PLDA), logistical regression, or the like, to perform the final scoring. Alternatively, instead of a backend classifier, a cosine distance computation between enrollment and test utterances can be used. The process may be repeated for a number of example utterances to obtain high precision.

Figure 5:
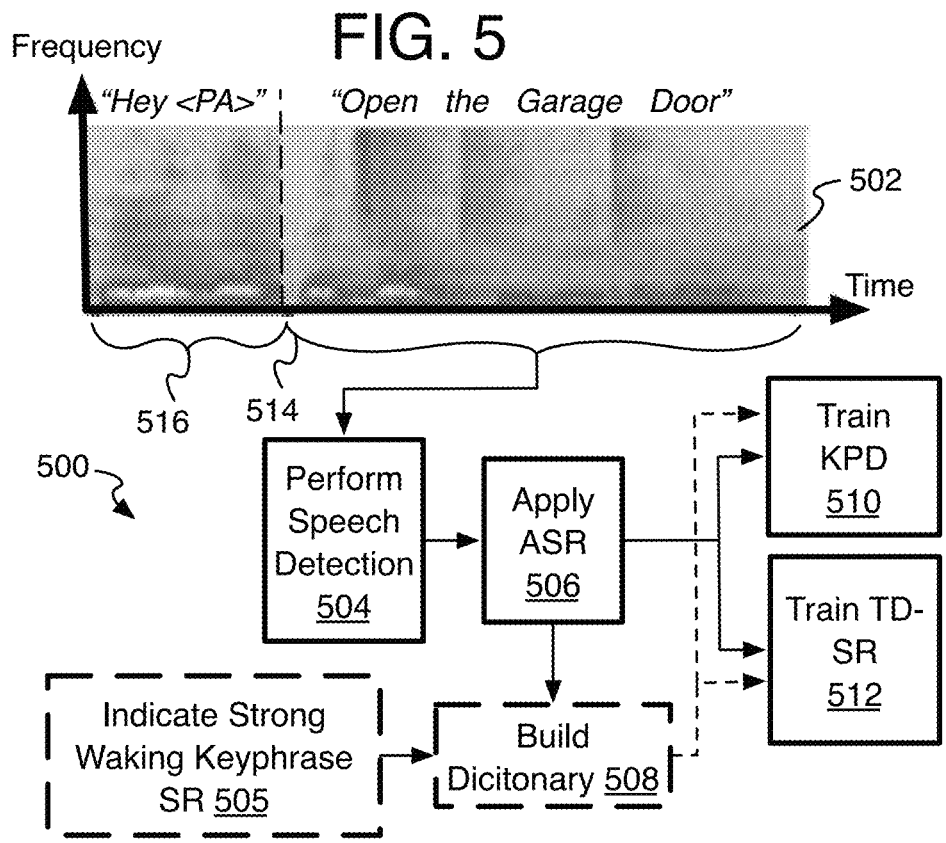
FIG. 5 is a schematic flow chart or enrollment of voice profiles for the robust speaker recognition activation process according to at least one of the implementations herein.

Referring to FIG. 5, an alternative enrollment process 500 is provided to increase accuracy for a specific user for robust speaker recognition activation, and specifically to generate the speaker models for speaker recognition of additional keyphrases in the command phrase, which is arranged in accordance with at least some implementations of the present disclosure. Process 500 may include one or more operations 502-512 generally numbered evenly. Process 500 or portions thereof may be performed by a device or system (e.g., systems 200, 1000, or any other device or system discussed herein).

Particularly, process 500 shows an example on-line, run-time, text-dependent voice enrollment process using the same contents of a captured audio signal as used with the process 400, where here a command phrase 514 is being enrolled after a waking keyphrase 516 has been recognized. A spectrogram 502 represents the capturing of the captured audio signal.

This process may be implemented after TD-SR has been applied to the waking keyphrase with strong positive results such that the voice speaking the waking keyphrase is recognized as coming from an authorized user for commands. A strong speaker recognition of the waking keyphrase may trigger the online command phrase speaker enrollment although other triggers could be used as well.

Once the waking keyphrase has been identified, speech detection may be performed 504 to prepare for TI-SR of the command phrase since presumably a working TD-SR speaker model has not been established yet. The segmented speech parts of the command phrase, however, also may be accessed to apply ASR 506 to the segmented command phrase parts. The recognized words or phrases can be collected to build 508 a dictionary of potential command keyphrases associated with that specific person who uttered the captured audio signal and to be used for text-dependent speaker recognition. Once the system has observed the same phrase for some number of times exceeding a threshold thereby deeming them command keyphrases, the system uses the command keyphrases to both train 510 specific user-defined keyphrase detection KPD speech models and train 512 TD-SR speaker models for the command phrase. By one example, the dictionary maintains each voice sample for each time the same command was stated so that a collection of samples of the same command word or phrase can be used for training KPD and TD-SR models. As an example, the user might say "Hello computer, open the garage door" every morning, and the system saves each or multiple samples of the user speaking the same phrase "open the garage door". Then, the system can build the KPD and TD-SR model for "open the garage door" using all of the samples.

A natural extension of this idea is rather than building a model of the entire phrase "open the garage door", word models may be built for individual words or other parts of the keyphrases such that when "open the front door" is spoken (rather than garage door for example), TD-SR models for the words "open", "the", and "door" are already learned from the earlier phrase with garage, so that the speaker of the command can be immediately recognized using TD-SR.

Once the command KPD and TD-SR models are sufficiently trained such that the training was based on the threshold number of samples that were collected in the dictionary, process 400 may be implemented where TD-SR or TD-SI is used depending on whether the command keyphrase detection found the command keyphrases in a command phrase as in process 400. For TD, the model may be ready after a small number of enrollment runs, while for TI more complex assessment may be needed. Generally, such sufficiency determination may be based on known methods factoring the variety and amount of language included as well as a measure of accuracy for example.

Once the models are established and being used during run-time, the models also can be updated when the same command is identified in the future. Since TD-SR has demonstrably better error rates compared to TI-SR, it is worthwhile to build such a TD-SR model. The comparison between TD and TI SR is shown below with the experimental results.

By yet another option, and together with the TD-SR models, user-specific KPD (or WoV) models may be used where the user selects desired keyphrases, rather than the system informing the user which keyphrases are to be used. This is disclosed in U.S. patent application Ser. No. 15/201,016, filed Jul. 1, 2016, and titled "USER DEFINED KEY PHRASE DETECTION BY USER DEPENDENT SEQUENCE MODELING", which is incorporated herein for all purposes. With this option, the high security speaker recognition activation can be practically completely user-specific such that both keyphrase detection and speaker recognition are based on user-specific keyphrases.

Figure 6:
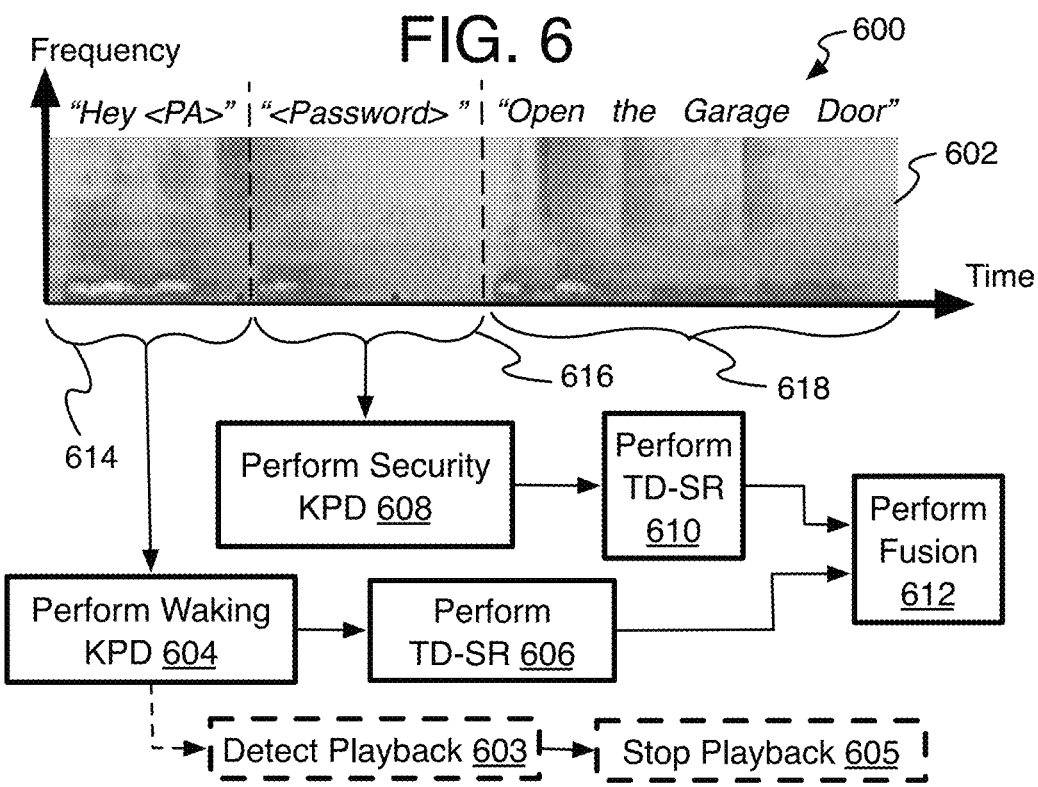
FIG. 6 is a schematic flow chart of another example process for robust speaker recognition activation according to at least one of the implementations herein.

Referring now to FIG. 6, one example process 600 of robust speaker recognition activation is arranged in accordance with at least some implementations of the present disclosure. Process 600 may include one or more operations 602-612 generally numbered evenly. Process 600 or portions thereof may be performed by a device or system (e.g., systems 200, 1000, or any other device or system discussed herein).

Process 600 has a captured audio signal as explained with signal 402 (FIG. 4), and the capture of which is represented by a spectrogram 602. The process 600 adds keyphrase detection and speaker recognition of a security phrase 616 between the waking keyphrase 614 and the command keyphrase 618. Thus, in this example, the subsequent phrase is the security phrase 616, and speaker recognition is applied to the security phrase 616 rather than the command phrase 618. The security keyphrase can be any language, word, or phrase where the longer the keyphrase, the greater the accuracy of the speaker recognition. By the current example, an audible password may be used as the security phrase.

As with process 400, the captured audio signal is monitored for a waking keyphrase 614 by keyphrase detection 604 and if found, TD-SR 606 is applied to form a waking speaker score or result. Here, however, keyphrase detection 608 and TD-SR 610 is applied to the security phrase 616 as well. This may involve a preliminary operation offline to enroll voice samples of a speaker uttering security keyphrases for building one or more security speaker models to be used for the TD-SR applied to the security phrase. By another alternative, the keyphrase detection and TD-SR modeling for the security phrase may be generated on-the-fly or on-line as with process 500 (FIG. 5) described above.

Figure 7:
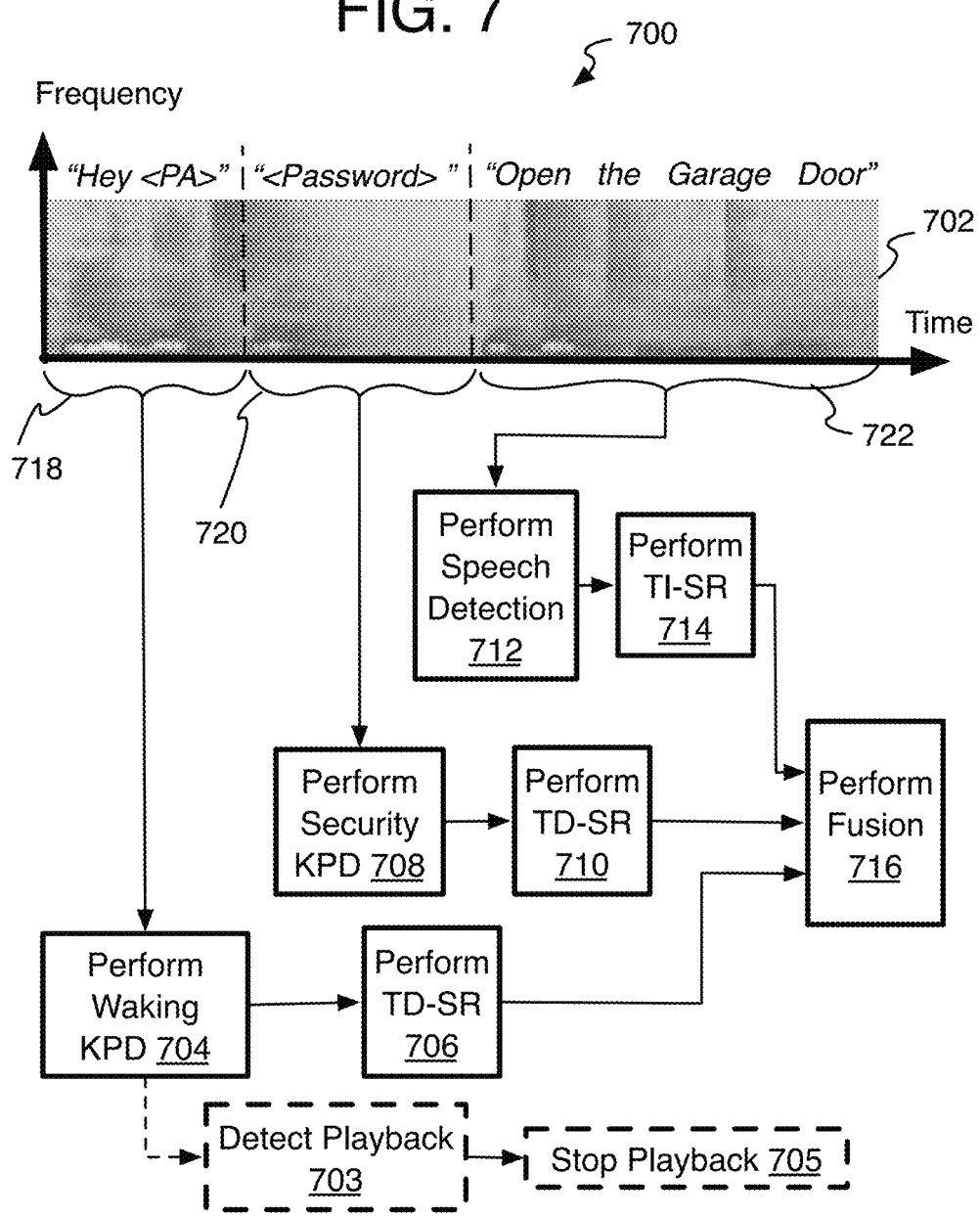
FIG. 7 is a schematic flow chart of another example process for robust speaker recognition activation according to at least one of the implementations herein.
Figure 8:
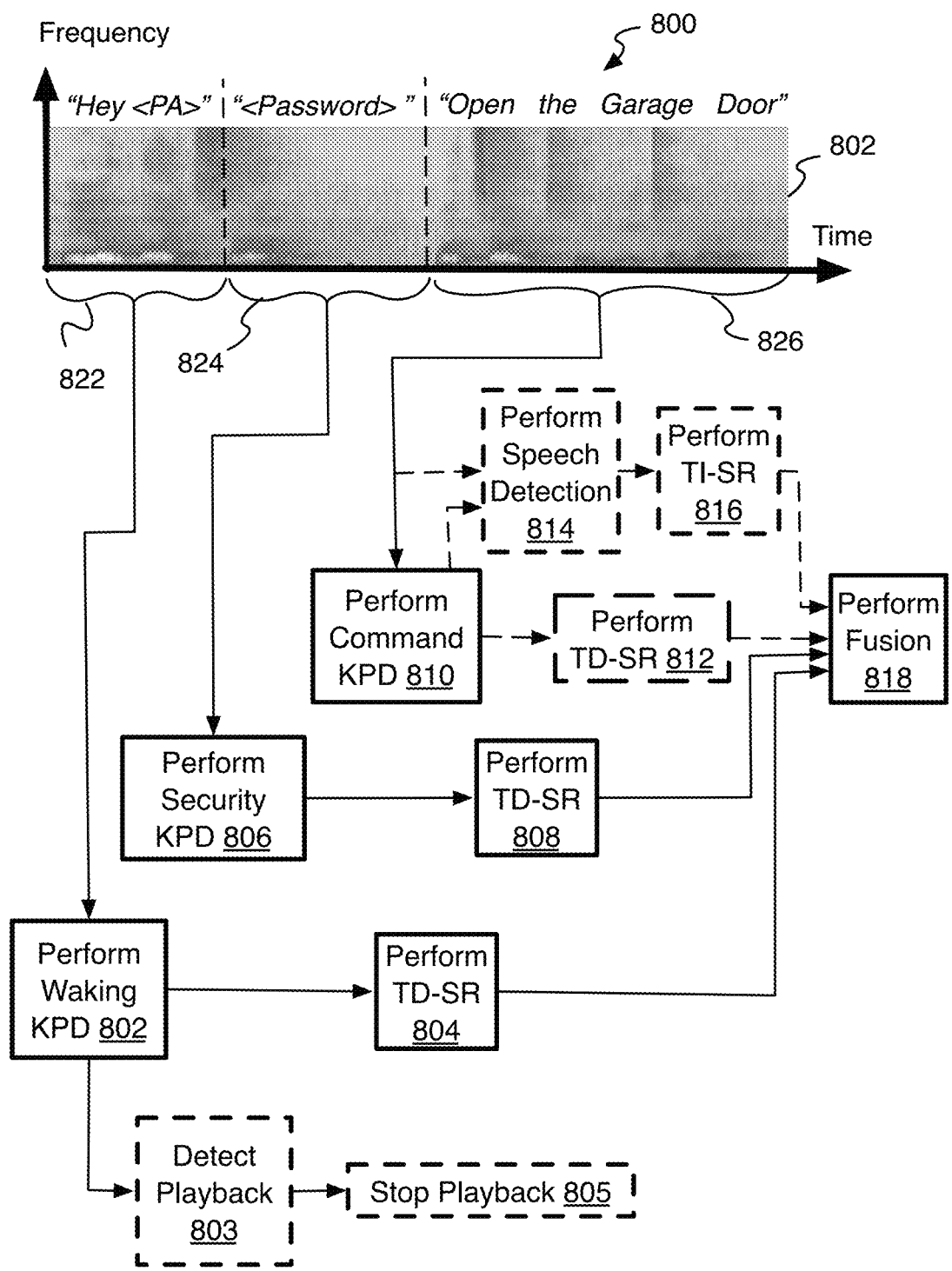
FIG. 8 is a schematic flow chart of another example process for robust speaker recognition activation according to at least one of the implementations herein.

As shown in FIGS. 6-8 for these examples, the audio signal is set along a timeline of a spectrogram 602 (and similarly with spectrograms 702 and 802 described below) so that the audio signal is continuous. As shown, the waking keyphrase, security phrase, and command phrase are provided in order without being interrupted by prompts for these examples.

By one form, the first time a user attempts to provide a command, or when reminders are helpful, the system may prompt the user to state a security keyphrase after uttering the waking keyphrase. This may be emitted audibly through device loudspeakers or visually on a computer display for example.

The security result or security speaker score then may be fused with the waking result or score to form a single speaker score (or set of speaker scores) or results indicating the likelihood that a speaker spoke the captured audio signal as described in detail with the fusion unit 220 of system 200 (FIG. 2). By a cascading-type alternative, the speaker score (or result) of the waking keyphrase detection may be considered a preliminary score, so that if the waking score passes one or more thresholds or meets other criteria, then the speaker score of the security keyphrase may be used alone as the basis for a final speaker score of the captured audio signal. This representative result or speaker score is then provided to determine if it meets one or more criterion, such as by comparison to one or more thresholds. Whether from fusion or a cascading technique, once the determination of speaker recognition is made for the captured audio signal, an application may or may not be permitted to perform the command from the command phrase 618.

By another approach, playback of media may be stopped if detected while attempting to detect the waking keyphrase, and so that stopping the playback before it can contaminate the part of the captured audio signal with a security keyphrase can provide a much cleaner (e.g., less noise) signal for the security keyphrase recognition for significantly increased accuracy for the speaker recognition of the security keyphrase. This may involve performing acoustic echo cancellation (AEC) during at least the waking keyphrase detection, but AEC may operate during analysis of other parts of the captured audio signal or of the entire captured audio signal. Once KPD has found a waking keyphrase triggering the security keyphrase detection and ASR of a command, the cancellation of audio by the AEC is checked to determine if media was detected 603 playing from the same current device generating the captured audio signal being analyzed. If media was found to be cancelled from the signal, the potential on-device media playback, such as music, sound tracks, radio, and so forth that is detected by the AEC operation, is turned off or stopped 605 so that the additional security phrase is spoken in a clean environment for higher accuracy. It will be appreciated that other devices that have their audio controllable by the current device could also have their playback stopped as well. For example, a PA or speaker recognition application of a smart speaker may be able to lower the volume or turn off a television communicatively connected to the smart speaker. Other ways of detecting media playing from the current device or another device that has audio that can be controlled by the current device may be used as well, such as signal pattern matching algorithms and so forth when the signal is being analyzed, but receiving "on" or volume indicator signals or reports from playback applications or programs could be used as well, and whether those playback applications are physically located on or off the current device. Such a playback termination option may be applied to any of the implementations herein including processes 400, 700, and 800.

Thus, for higher security applications, the use of this additional text-dependent security keyphrase after the waking keyphrase has a number of advantages. First, and as mentioned, higher accuracy results due to carefully-chosen, longer text-dependent content. Second, a better user-experience results due to greater accuracy caused by the termination of playback so that TD-SR of the security phrase has a cleaner signal with the playback off.

Referring to FIG. 7, one example process 700 of robust speaker recognition activation is arranged in accordance with at least some implementations of the present disclosure. Process 700 may include one or more operations 702-716 generally numbered evenly. Process 700 or portions thereof may be performed by a device or system (e.g., systems 200, 1000, or any other device or system discussed herein).

Process 700 uses the same or similar waking and security keyphrase detection and TD-SR as process 600 (FIG. 6) so that the description of these operations need not be repeated here. The same captured audio signal as used in process 600 is repeated here as well, and the capture of which is represented by the spectrogram 702 where here a waking keyphrase 718 precedes a security phrase 720 which comes before a command phrase 722. Operations that are similar between the two processes are named and numbered similarly. Process 700, however, adds speech detection 712 and text-independent TI-SR operations 714 applied to the command phrase. By one example, the TI-SR is applied to the command phrase after successful keyphrase detection on the waking keyphrase and security keyphrase. This results in speaker scores or results from three different speaker recognition operations on the three different phrases (waking, security, and command). By one approach, a relatively lower confidence speaker score may be required for a positive recognition for either of the TD-SR operations while a higher speaker score may be needed for a positive result from the TI-SR operation since the TD-SR is found to be more accurate than the TI-SR. By one form, these three results are fused as described above with fusion unit 220 (FIG. 2) to form a single speaker score (or single set of scores (or results) that are then compared to thresholds or otherwise determined if the results or scores meet some criteria to indicate an authorized user uttered the language of the captured audio signal.

By alternative cascading approaches, first the two TD-SR results are fused, and the fused speaker score is analyzed to determine if the fused speaker score meets one or more criteria. If so, only then is the speaker score of the TI-SR on the command phrase considered. By one form, all three speaker scores or results are still fused to form a single speaker score result, but by other approaches for cascading the operations, the TI-SR speaker score may be the final and only speaker score representing the captured audio signal. By yet another alternative, all three scores or results are considered individually. For example, a speaker decision is formed for the waking keyphrase, and if positive, then the security keyphrase, and if that is positive, then the speaker score of the command keyphrase is considered. Other alternatives may be used as well.

Referring to FIG. 8, an example process 800 of robust speaker recognition activation is arranged in accordance with at least some implementations of the present disclosure. Process 800 may include one or more operations 802-820 generally numbered evenly. Process 800 or portions thereof may be performed by a device or system (e.g., systems 200, 1000, or any other device or system discussed herein).

Process 800 uses the same or similar waking and security keyphrase detection and TD-SR so that the description of these operations need not be repeated here, and is shown capturing 802 the same captured audio signal as in process 600 (FIG. 6) and 700 (FIG. 7) where here a waking keyphrase 822 precedes a security phrase 824 which comes before a command phrase 826. Operations that are similar between the two processes are named and numbered similarly. Process 800, however, adds a command keyphrase detection 810 and command TD-SR operations applied to the command phrase in addition to the speech detection and TI-SR described for process 700, except here, the TD-SR and TI-SR are applied to the command phrase in the alternative as with process 400. Thus, after training (or enrolling) KPD and TD-SR models, whether offline or online as described above with process 500, for the command phrase 826, a TD-SR pipeline can be employed for the command phrase.

Thus, process 800 provides a relatively longer security phrase after the waking keyphrase, and an extra TD-SR analysis for commonly used command phrases when such model has been trained. The waking keyphrase and security keyphrase detection and TD-SR are handled as described above with process 600 and 700. As with process 400, the command phrase here has two pipelines that are handled separately. By one form, TD-SR and TI-SR are initially performed in parallel no matter the results of the command KPD 810. Thus, a speech detection engine or unit segments 814 the command phrase into speech portions, and one or more non-command specific TI-SR pipelines are available to recognize 816 the speaker of the command phrase so that the speaker score of the TI-SR can be used when the command is unknown. In parallel, TD-SR may be performed 812 to provide a speaker score that can be used when the command KPD 810 recognized command keyphrases in the command phrase 826. When the result of the command KPD 810 is positive, the output (or speaker score) of the command TD-SR 812 is used, but when the result of the KPD 810 is negative, then the output (speaker score) of the TI-SR is used instead. It will be appreciated that alternative operations could be used where command TI-SR is only applied in the first place when the command KPD is negative.

For fusing the results of the different SR operations or pipelines, the speaker scores or other separate results from all three phrases (waking, security, and command) may be fused together, where the command phrase result may alternatively be from TD-SR or TI-SR as described with process 800. By another alternative, the cascading technique may be used from process 700 and applied equally here where either individually (with waking score first and then security score) or fused together, the speaker score or results from the waking TD-SR and security TD-SR may compared to criteria first in order to determine whether the results or scores from the command phrase should be considered as well. The command score then may be fused to the TD-SR scores or may be considered separately as the final representation of the capture audio signal. Thereafter, once a decision is made by comparing a fused or cascaded result or score to some criteria, an application may or may not be permitted to perform the command.

Referring to FIG. 8A, by yet another alternative process 850, the use of the security phrase may be stopped once the TD-SR operations are being performed on the command phrase. Process 850 may include one or more operations 852-860 generally numbered evenly. Process 850 or portions thereof may be performed by a device or system (e.g., systems 200, 1000, or any other device or system discussed herein).

By this alternative, process 800 may include "monitor TD-SR model for sufficiency of enrollment of command phrases" 852. By one option, this operation is satisfied simply by the system determining the TD-SR models were trained with a sufficient number of voice samples of certain commands usually spoken by a user and are ready to use. Otherwise, this may include "determine if models cover a sufficient portion of usual commands" 854, where the security phrase SR may remain in use until some percentage of the commands provide by a user are modeled for the command phrase. Other alternatives are contemplated as well.

Process 800 may include "turn off security phrase detection" 856, where this may be a binary indicator provided by the security phrase on/off control unit 240 (FIG. 2), and provided to a KPD unit 206 for example to omit the security KPD and in turn the security SR operations, or flags may be used. Other ways may be used as well.

Once or upon the security keyphrase KPD being turned off, process 800 may include "provide indication to user that security phrase is no longer needed" 858, and this may be provided to the user through any appropriate interface with the user such as audibly through loudspeakers or visually on a computer or computing device display for example. This message may be in the form of a SMS message to a mobile device, email, or other visible message. The message may be a general message for all usual commands from a user or could be emitted on a command by command basis.

Process 800 may include "set waking keyphrase detection to trigger command keyphrase detection" 860. Now that the security keyphrase KPD and security SR are omitted, the system needs the waking keyphrase detection to trigger the command KPD. This also may be performed by a binary indicator from the security phrase on/off control unit 240, setting of flags, and so forth as well.

Experiments and Results

An experiment was conducted to measure an equal error rate performance of TD and TI systems for the following list of commands, under several different background noise conditions:

Alexa, what is the weather tomorrow?
Alexa, play some good music
Alexa, find a good restaurant close by
Alexa, what is my commute?
Alexa, read my news
Alexa, how did my team do today?
Alexa, find the recipe for my favorite dish
Alexa, set a timer for 10 minutes
Alexa, what's on tv tonight?
Alexa, are there good movies playing today?

"Alexa" was used for the TD-SR, and the whole phrase "Alexa, <command>" is used for TI-SR.

Even though the TD-SR segment is so much shorter than the TI-SR segment, significantly lower error rates were measured with the TD-SR system compared to the TI-SR system. This shows that speaker recognition is much more accurate when the utterance is phonetically-constrained as shown on table 1 below.

TABLE 1

| Condition | Text-dependent | Text-Independent |
| --- | --- | --- |
| Clean | 1.69 | 4.71 |
| Classical music | 2.20 | 7.43 |
| Pop music | 3.42 | 9.52 |
| Side female talker | 3.16 | 8.75 |
| Side male talker | 3.07 | 8.42 |

Another experiment compares the EER of two common wakeup phrases as follows to compare input voice sample length.

TABLE 2

| | Hey Cortana | | Alexa | |
| --- | --- | --- | --- | --- |
| Condition | array A EER (%) | array B EER (%) | array A EER (%) | array B EER (%) |
| Clean | 0.87 | 2.81 | 2.05 | 4.49 |
| Classical music | 1.93 | 8.13 | 3.61 | 8.79 |
| Pop music | 7.06 | 26.43 | 7.13 | 21.92 |
| Side talker female | 1.65 | 6.66 | 3.13 | 7.19 |
| Side talker male | 2.09 | 8.85 | 3.53 | 9.68 |

Here, two mic arrays were used: array A is directly in front of the user, no farther than 0.5 m, and array B is 2.5 m behind the user. Except for one case (pop music in background), the longer phrase "Hey Cortana" had better results which shows that speaker recognition is almost always more accurate the longer the phrase no matter the background noise condition.

Referring to FIG. 9, an experiment also was conducted comparing the two phrases mentioned above on table 2 with a much longer phrase "I am<name>, my name is my password." The detection error tradeoff plot 900 shows a clear consistent trend that the longer the phrase, the lower the error rates when the same speaker recognition technique is used (here being TD-SR). The EER for "Alexa", "Hey Cortana", and "I am<name>, my name is my password" are 2.05, 0.87, and 0.27%, respectively. For this test set, FAR of 0% is achieved at FRR of around 1%, which proves the benefits of a long security phrase interaction.

Figure 10:
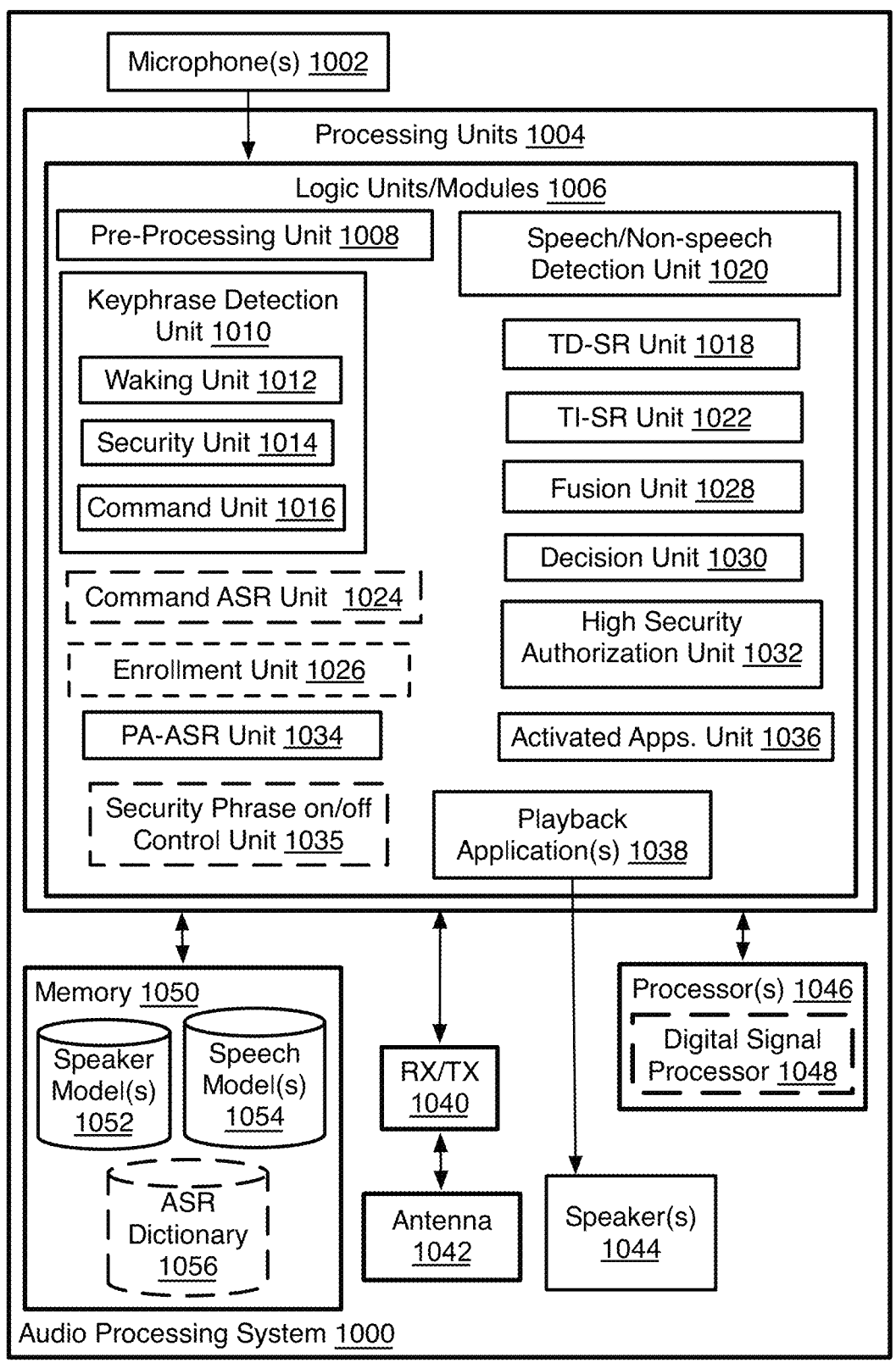
FIG. 10 is an illustrative diagram of an example system for providing the robust speaker recognition activation described herein.

Referring to FIG. 10, an example audio processing system 1000 for providing speaker recognition activation is arranged in accordance with at least some implementations of the present disclosure. System 1000 may include at least one microphone 1002, processing units 1004 including logic units or logic modules 1006, a transmission (RX/TX) unit(s) 1040 and antenna 1042 to receive or transmit audio back and forth from the device 1000 for example, memory 1050, one or more processors 1046, and one or more speakers 1044. The system may be considered a smartspeaker or may have a smartspeaker to implement all or some of the logic units described herein. Otherwise, the system 1000 may have or be any of the other devices mentioned herein that provides the audio analysis capabilities described herein.

To perform the KPD or WoV applications, the logic units/modules 1006 may have a pre-processing unit 1008 that receives the captured audio signals from the microphone(s) 1002, and a keyphrase detection unit 1010 that may have a waking unit 1012 for operations on a waking keyphrase, a security unit 1014 for operations detecting a security keyphrase, and a command unit 1016 for detecting command keyphrases, and each performed to do the triggering of actions, waking of a PA, and/or SR operations as described above.

To perform the speaker recognition operations, the logic units/modules 1006 also may include an enrollment unit 1026, a TD-SR unit 1018, a TI-SR unit 1020, a fusion unit 1028, a decision unit 1030, a high security authorization unit 1032 a PA-ASR unit 1034 that analyzes the phrases for understanding the command for the PA, a command ASR unit 1024 for building a dictionary 1056 to perform command TD-SR, a security phrase on/off control unit 1035 to turn the security keyphrase detection off when desirable, an activated applications unit 1036, and a playback application(s) unit 1038 that provide audio data or signals for output to loudspeaker(s) 1044.

At least one processor 1046 may or may not be a central processor, and may be or have a digital signal processor 1048 that may include any number and type of processing units that may perform the operations as discussed herein. Such operations may be implemented via software, firmware, hardware or a combination thereof. For example, digital signal processor 1048 may include circuitry dedicated to manipulating data obtained from memory 1050 or dedicated memory. Furthermore, processor(s) 1046 may include any number and type of processing units or modules that may provide control and other high level functions for system 1000 as well as the operations as discussed herein. In the illustrated example, system 1000 may be configured to perform keyphrase detection (KPD or voice activation (WoV)) and/or text-dependent or text independent speaker recognition as well as other operations related thereto and as disclosed herein.

Memory 1050 may be, or include, any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1050 may be implemented at least in part by cache memory. By one form, one or more memories may store one or more speaker models 1052, one or more speech models 1054, and/or one or more ASR dictionaries 1056 for use as described above.

It will be understood that the system 1000 may not have all parts of all units and models on the same physical device, such as a smart speaker, and any of the units described as included on a device or system may be communicatively connected to the device but may be partly or entirely physically located remotely from the device.

The operation of the components or units of system 1000 are clear from the description of the systems and methods already described above. Thus, the names of the components of system 1000 are similar to the name or functions described above, so that the name of the units or components reveal which functions are performed by that component.

While implementation of the example processes discussed herein may include the undertaking of all operations shown in the order illustrated, the present disclosure is not limited in this regard and, in various examples, implementation of the example processes 300, 400, 500, 600, 700, 800, and 850 herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" or "unit" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
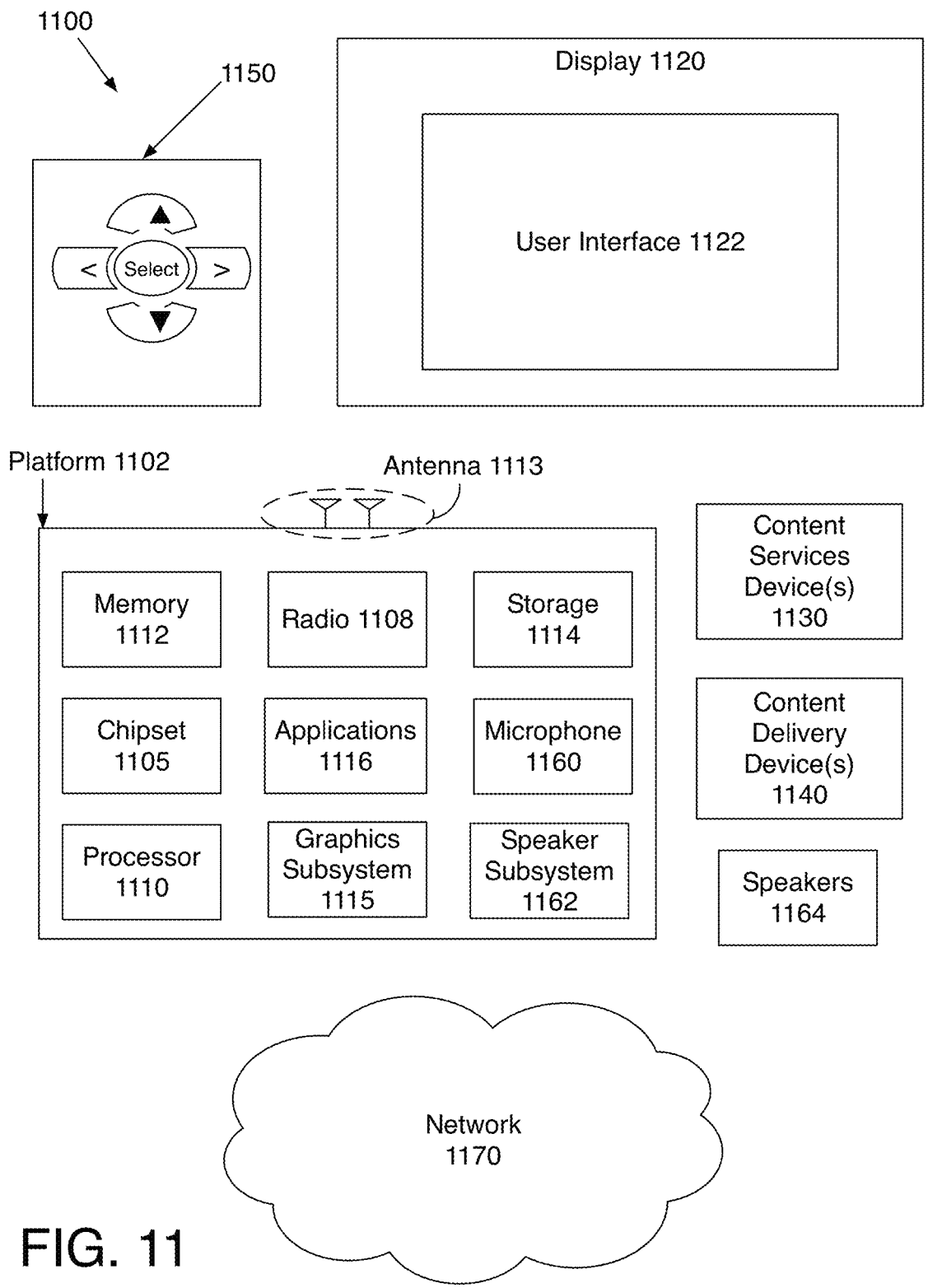
FIG. 11 is an illustrative diagram of an example system.

Referring to FIG. 11, an example system 1100 is arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart speaker, smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. As shown, in some examples, system 1100 may include microphone 1160 (or 202 (FIG. 2)) implemented via platform 1102. Platform 1102 may receive input speech via microphone 1160 as discussed herein and provide audio output over one or more speakers 1164. A navigation controller 1150 including one or more navigation features may be used to interact with, for example, platform 1102 and/or display 1120. Each of these components is described in greater detail below.

In various implementations, system 1100 may provide speaker recognition for a device as described. In other implementations, system 1100 may provide for keyphrase detection and robust speaker recognition activation as discussed herein.

In various implementations, platform 1102 may include any combination of a chipset 1105, processor 1110, memory 1112, antenna 1113, storage 1114, graphics subsystem 1115, speaker sub-system 1162, applications 1116 and/or radio 1108. Chipset 1105 may provide intercommunication among processor 1110, memory 1112, storage 1114, speaker sub-system 1162, applications 1116 and/or radio 1108. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x126 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

A speaker sub-system 1162 may perform processing of audio for emission by the device over one or more speakers 1164 included in the sub-system. An analog or digital interface may be used to communicatively couple speaker sub-system 1162 and speakers 1164. Speaker subsystem 1162 may be integrated into processor 1110 or chipset 1115. In some implementations, speaker subsystem 1162 may be a stand-alone device communicatively coupled to chipset 1105.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implements, the functions may be implemented in a consumer electronics device.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1115. In some implementations, graphics subsystem 1115 may be a stand-alone device communicatively coupled to chipset 1105.

Radio 1108 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1108 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1170 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1170 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various implements, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various implements, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off" In addition, chipset 1105 may include hardware and/or software support for 5.1 surround sound audio and/or high definition 7.1 surround sound audio, for example. Drivers may include a graphics driver for integrated graphics platforms. In various implements, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implements, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implements, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implements, however, are not limited to the elements or in the context shown or described in FIG. 11.

Figure 12:
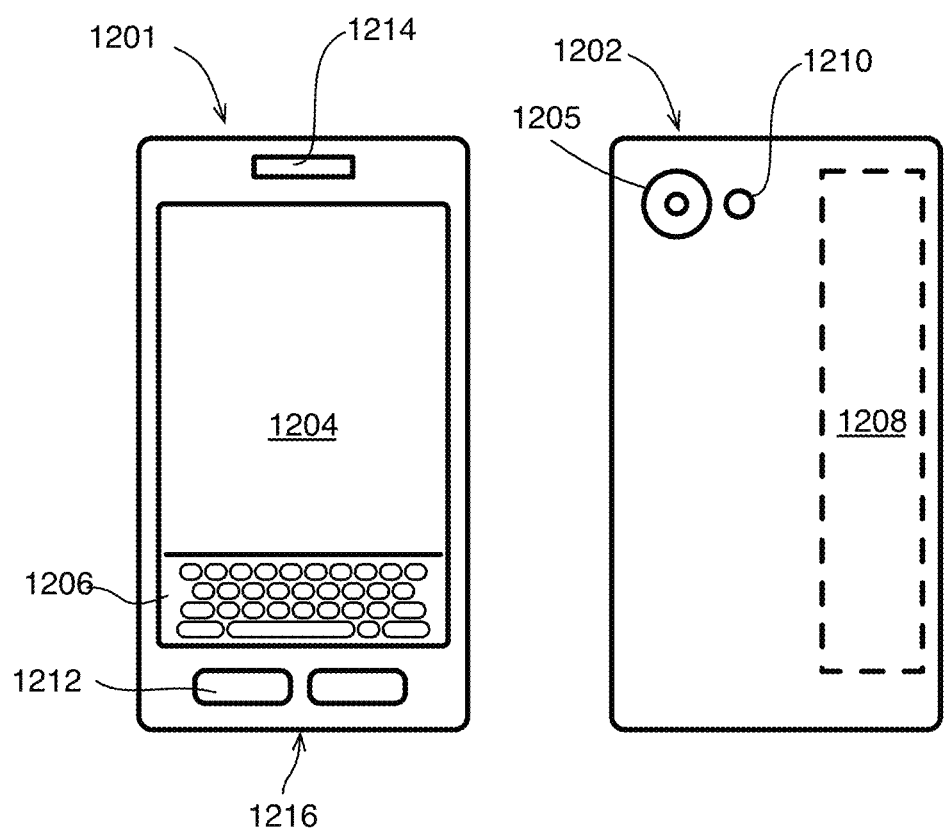
FIG. 12 illustrates an example device, all arranged in accordance with at least some implementations of the present disclosure.

Referring to FIG. 12, systems 1000 and 1100 may be embodied in varying physical styles or form factors. A small form factor device 1200 is arranged in accordance with at least some implementations of the present disclosure such that system 1000 or 1100 may be implemented via device 1200. In other examples, other devices or systems, or portions thereof may be implemented via device 1200. In various implements, for example, device 1200 may be implemented as a mobile computing device having wireless capabilities. A mobile computing device may refer to any device having a processing system and a mobile power source or supply, such as one or more batteries, for example.

Examples of a mobile computing device may include a smartspeaker, personal computer (PC), laptop computer, ultra-laptop computer, tablet, phablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various implements, for example, a mobile computing device may be implemented as a smart phone capable of executing computer applications, as well as voice communications and/or data communications. Although some implements may be described with a mobile computing device implemented as a smart phone by way of example, it may be appreciated that other implements may be implemented using other wireless mobile computing devices as well. The implements are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of one or more microphones 1216, and/or may be digitized by an audio processing, or voice recognition, device. The device 1200 also may have one or more speakers 1214 as well. As shown, device 1200 may include a camera 1205 (e.g., including a lens, an aperture, and an imaging sensor) and a flash 1210 integrated into back 1202 (or elsewhere) of device 1200.

Various implements may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implement is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implement may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of speech recognition activation comprises monitoring a captured audio signal of sound captured from at least one microphone to automatically recognize at least one speaker of at least one targeted waking keyphrase in the captured audio signal; monitoring a non-waking subsequent phrase in the captured audio signal that is subsequent to the waking keyphrase to detect at least one additional targeted keyphrase in the subsequent phrase; applying speaker recognition to the subsequent phrase; and permitting an application to act in response to speech content of the captured audio signal at least partly depending on the speaker recognition applied to both the waking keyphrase and the subsequent phrase.

Otherwise, the method may include that wherein the subsequent phrase comprises the speech content and is at least one command to at least one computer application to act in response to the content, wherein applying speaker recognition to the subsequent phrase comprises alternatively performing text-dependent speaker recognition or text-independent speaker recognition depending on whether keyphrase detection finds at least one of the additional keyphrases in the subsequent phrase, and the method comprises constructing a dictionary of at least part of the subsequent phrase of a plurality of captured audio signals and spoken by a user and during a run-time while the user is operating a computing device receiving the captured audio signals; enrolling the at least part of the subsequent phrase from the dictionary to form one or more text-dependent voice profiles; and performing text-dependent speaker recognition using the text-dependent voice profiles to determine the speaker of the subsequent phrases of other captured audio signals; separately enrolling at least one or more individual words of the subsequent phrase rather than phrases of multiple words as a single entry and to be enrolled to add to one or more text-dependent voice profiles.

By another approach, the subsequent phrase is a security phrase, and wherein the captured audio signal comprises a command phrase that is after the security phrase in the captured audio signal, wherein text-dependent speaker recognition is applied to the security phrase. By one option, text-independent speaker recognition is applied to the command phrase. By an alternative option, applying speaker recognition to the command phrase comprises alternatively performing text-dependent speaker recognition or text-independent speaker recognition depending on whether keyphrase detection finds at least one of the additional keyphrases in the subsequent phrase. By one option. the permitting of an application to act depends on the speaker recognition applied to the waking keyphrase, the security phrase, and the command phrase. By an alternative, the method comprises determining a fused speaker score factoring the speaker recognition applied to both the waking keyphrase and the security phrase; and if the fused speaker score meets at least one criterion, then determining whether or not the speaker recognition results of the command phrase meets at least one criterion to determine whether or not the speaker of the captured audio signal has been recognized. The method also may comprise audibly emitting media that will be represented in the captured audio signal; and automatically stopping the emission of the media when a waking keyphrase is detected in the captured audio signal so that the media will not be included in a portion of the captured audio signal that is to be monitored for presence of the at least one security phrase.

By yet another implementation, a computer-implemented system of speaker recognition activation comprises at least one microphone providing at least one captured audio signal; memory to store a form of the at least one captured audio signal; at least one processor communicatively coupled to the memory and at least one microphone and to operate by: monitoring the captured audio to automatically recognize at least one speaker of at least one targeted waking keyphrase in the captured audio signal; monitoring a non-waking subsequent phrase in the captured audio signal that is subsequent to the waking keyphrase to detect at least one additional targeted keyphrase in the subsequent phrase; applying speaker recognition to the subsequent phrase; and permitting an application to act in response to speech content of the captured audio signal at least partly depending on the speaker recognition applied to both the waking keyphrase and the subsequent phrase.

By another example, the system provides that wherein the subsequent phrase is a security phrase, and wherein the captured audio signal comprises a command phrase that is after the security phrase in the captured audio signal, wherein text-dependent speaker recognition is performed on the security phrase, wherein the at least one processor is to operate by applying speaker recognition to the command phrase, and factoring the speaker recognition results applied to the waking keyphrase, the security phrase, and the command phrase to determine whether to permit the application to act, wherein applying speaker recognition to the command phrase comprises alternatively performing text-dependent speaker recognition or text-independent speaker recognition depending on whether at least one of the additional keyphrases is found in the command phrase by performing keyphrase detection. Alternatively the at least one processor is to operate by: determining a fused speaker score factoring the speaker recognition applied to both the waking keyphrase and the security phrase; and if the fused speaker score meets at least one criterion, then determining whether or not the speaker recognition results of the command phrase meets at least one criterion to determine whether or not the speaker of the captured audio signal has been recognized. The system comprising: a loudspeaker arranged to emit audio media; and wherein the at least one processor is to operate by controlling the emission of the media and turning off the emission of the media when indication is received that a waking keyphrase has been found in the captured audio signal and to prevent representation of the media in a part of the captured audio signal to be monitored to detect the security phrase. wherein the subsequent phrase is initially a security phrase between the waking keyphrase and a command phrase in the captured audio signal; and the at least one processor to operate by: determining which phrases or words should be used as command keyphrases, the command keyphrases being obtained from the command phrase during a run-time; enrolling the command keyphrases into a text-dependent speaker recognition model of the command phrase; and omitting speaker recognition of the security phrase once it is determined that the text-dependent speaker recognition model is sufficiently established to perform the text-dependent speaker recognition on the command phrase so that the subsequent phrase becomes the command phrase; wherein the at least one processor is to operate by providing a notification on an interface with a user to stop using at least one security phrase once it is decided to omit the speaker recognition of a security phrase.

By one approach, at least one machine readable medium comprising a plurality of instructions that, in response to being executed on at least one computing device, cause the computing device to operate by: determining a first score indicating a likelihood that a captured audio signal of sound captured from at least one microphone includes at least one waking keyphrase spoken by an automatically recognizable voice; detecting whether or not a subsequent phrase in the captured audio signal that is subsequent to the waking keyphrase includes at least one additional keyphrase found by using keyphrase detection on the subsequent phrase; determining a second score indicating a likelihood that the at least one additional keyphrase was spoken by an automatically recognizable voice; and permitting an application to act in response to speech content of the captured audio signal at least partly depending on the recognition of at least one speaker of the captured audio signal determined by factoring at least both the first and second scores.

By another approach, the instructions cause the computing device to operate so that wherein the subsequent phrase comprises the speech content and is at least one command to at least one computer application to act in response to the content; the instructions cause the computing device to operate by performing text-dependent speaker recognition and text-independent speaker recognition of the subsequent phrase in parallel; and using the second score of the text-dependent or text independent speaker recognition depending on whether the key phrase detection finds at least one of the additional keyphrases in the subsequent phrase, wherein the instructions cause the computing device to operate by constructing a dictionary of at least part of the subsequent phrase spoken by a user and during a run-time while a user is operating a computing device receiving the captured audio signal; enrolling at least part of the subsequent phrase from the dictionary to form one or more text-dependent voice profiles; and performing text-dependent speaker recognition using the text-dependent voice profiles to form the second score.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of speaker recognition activation, comprising:
    monitoring an audio signal captured from at least one microphone to automatically recognize at least one speaker of at least one targeted waking keyphrase;
    detecting at least one additional targeted keyphrase in a non-waking subsequent phrase that is subsequent to the waking keyphrase;
    applying speaker recognition comprising combining at least confidence scores of the waking keyphrase and the subsequent phrase to form a single score compared to a threshold, wherein the subsequent phrase is initially a security phrase and text-dependent speaker recognition is performed on the security phrase, wherein the captured audio signal comprises a command phrase forming speech content and that is after the security phrase, and wherein the audio signal is continuous so that the waking keyphrase, subsequent phrase, and command phrase are provided in order without being interrupted by prompts;
    alternatively performing text-dependent speaker recognition or text-independent speaker recognition on the command phrase depending on whether at least one keyphrase is detected in the command phrase;
    permitting an application to act at least partly depending on the speaker recognition and the speech content; and
    audibly or visually announcing the security phrase is no longer needed to a user and omitting detection of the security phrase, after a sufficient coverage of commands are enrolled in a speaker model.

2. The method of claim 1 comprising constructing a dictionary of at least part of the subsequent phrase of a plurality of captured audio signals and spoken by a user and during a run-time while the user is operating a computing device receiving the captured audio signals;
    enrolling the at least part of the subsequent phrase from the dictionary to form one or more text-dependent voice profiles; and
    performing text-dependent speaker recognition using the text-dependent voice profiles to determine the speaker of the subsequent phrases of other captured audio signals.

3. The method of claim 2 comprising separately enrolling at least one or more individual words of the subsequent phrase rather than phrases of multiple words as a single entry and to be enrolled to add to one or more text-dependent voice profiles.

4. The method of claim 1 wherein text-independent speaker recognition is applied to the command phrase.

5. The method of claim 1 wherein the permitting of an application to act depends on the speaker recognition applied to the waking keyphrase, the security phrase, and the command phrase.

6. The method of claim 1 comprising:
    determining a fused speaker score as the single score factoring the speaker recognition applied to both the waking keyphrase and the security phrase; and
    if the fused speaker score meets at least one criterion, then determining whether or not the speaker recognition results of the command phrase meets at least one criterion to determine whether or not the speaker of the captured audio signal has been recognized.

7. The method of claim 1 comprising audibly emitting media represented in the captured audio signal; and
    automatically stopping the emission of the media when a waking keyphrase is detected in the captured audio signal so that the media will not be included in a portion of the captured audio signal that is to be monitored for presence of the at least one security phrase.

8. A computer implemented audio processing system comprising:
- at least one microphone providing at least one captured audio signal;
- memory to store a form of the at least one captured audio signal;
- at least one processor communicatively coupled to the memory and at least one microphone and to operate by:
- monitoring the captured audio to automatically recognize at least one speaker of at least one targeted waking keyphrase;
- monitoring a non-waking subsequent phrase that is subsequent to the waking keyphrase to detect at least one additional targeted keyphrase;
- applying speaker recognition comprising combining at least confidence scores of the waking keyphrase and the subsequent phrase to form a single score compared to a threshold, wherein the subsequent phrase is initially a security phrase and text-dependent speaker recognition is performed on the security phrase, wherein the captured audio signal comprises a command phrase forming speech content and that is after the security phrase, and wherein the audio signal is continuous so that the waking keyphrase, subsequent phrase, and command phrase are provided in order without being interrupted by prompts;
- alternatively performing text-dependent speaker recognition or text-independent speaker recognition on the command phrase depending on whether at least one keyphrase is detected in the command phrase;
- permitting an application to act at least partly depending on the speaker recognition and the speech content; and
- audibly or visually announcing the security phrase is no longer needed to a user and omitting detection of the security phrase, after a sufficient coverage of commands are enrolled in a speaker model.

9. The system of claim 8 wherein the at least one processor is to operate by applying speaker recognition to the command phrase, and factoring the speaker recognition results applied to the waking keyphrase, the security phrase, and the command phrase to determine whether to permit the application to act.

10. The system of claim 8 wherein the at least one processor is to operate by:
- determining a fused speaker score as the single score factoring the speaker recognition applied to both the waking keyphrase and the security phrase; and
- if the fused speaker score meets at least one criterion, then determining whether or not the speaker recognition results of the command phrase meets at least one criterion to determine whether or not the speaker of the captured audio signal has been recognized.

11. The system of claim 8 comprising:
- a loudspeaker arranged to emit audio media; and wherein the at least one processor is to operate by controlling the emission of the media and turning off the emission of the media when indication is received that a waking keyphrase has been found in the captured audio signal and to prevent representation of the media in a part of the captured audio signal to be monitored to detect the security phrase.

12. The system of claim 8 wherein the at least one processor to operate by:
- determining which phrases or words should be used as command keyphrases, the command keyphrases being obtained from the command phrase during a run-time;
- enrolling the command keyphrases into a text-dependent speaker recognition model of the command phrase and that is the speaker model; and
- omitting speaker recognition of the security phrase once it is determined that the text-dependent speaker recognition model is sufficiently established to perform the text-dependent speaker recognition on the command phrase so that the subsequent phrase becomes the command phrase.

13. The system of claim 12 wherein the at least one processor is to operate by providing a notification on an interface with a user to stop using at least one security phrase once it is decided to omit the speaker recognition of a security phrase.

14. At least one non-transitory machine readable medium comprising a plurality of instructions that, in response to being executed on at least one computing device, cause the computing device to operate by:
- determining a first score indicating a likelihood that an audio signal captured from at least one microphone includes at least one waking keyphrase spoken by an automatically recognizable voice;
- detecting whether or not a subsequent phrase that is subsequent to the waking keyphrase includes at least one additional keyphrase,
- wherein the subsequent phrase is initially a security phrase and text-dependent speaker recognition is performed on the security phrase, wherein the captured audio signal comprises a command phrase that is after the security phrase in the captured audio signal, and wherein the audio signal is continuous so that the waking keyphrase, subsequent phrase, and command phrase are provided in order without being interrupted by prompts;
- determining a second score indicating a likelihood that the at least one additional keyphrase was spoken by an automatically recognizable voice;
- permitting an application to act in response to speech content of the command phrase in the captured audio signal at least partly depending on the recognition of at least one speaker of the captured audio signal determined by combining at least both the first and second scores to form a single score to be compared to a threshold;
- alternatively performing text-dependent speaker recognition or text-independent speaker recognition on the command phrase depending on whether at least one keyphrase is detected in the command phrase; and
- audibly or visually announcing the security phrase is no longer needed to a user and omitting detection of the security phrase, after a sufficient coverage of commands are enrolled in a speaker model.

15. The medium of claim 14 comprising performing text-dependent speaker recognition and text-independent speaker recognition of the command phrase in parallel; and using the second score of the text-dependent or text independent speaker recognition depending on whether the key phrase detection finds at least one of the additional keyphrases in the command phrase.

16. The medium of claim 14 wherein the instructions cause the computing device to operate by constructing a dictionary of at least part of the subsequent phrase spoken by a user and during a run-time while a user is operating a computing device receiving the captured audio signal;

enrolling at least part of the subsequent phrase from the dictionary to form one or more text-dependent voice profiles; and performing text-dependent speaker recognition using the text-dependent voice profiles to form the second score.

* * * * *